United States Patent
Jozwiak et al.

(10) Patent No.: US 9,882,722 B2
(45) Date of Patent: Jan. 30, 2018

(54) PRODUCT AUTHENTICATION USING END-TO-END CRYPTOGRAPHIC SCHEME

(71) Applicant: QUALCOMM Incorporated, San Diego, CA (US)

(72) Inventors: John Jozwiak, Cupertino, CA (US); Gregory Gordon Rose, San Diego, CA (US); Alexander Gantman, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 14/457,912

(22) Filed: Aug. 12, 2014

(65) Prior Publication Data
US 2014/0351601 A1    Nov. 27, 2014

Related U.S. Application Data

(62) Division of application No. 12/888,231, filed on Sep. 22, 2010, now Pat. No. 8,839,459.

(51) Int. Cl.
*H04L 29/06* (2006.01)
*H04L 9/32* (2006.01)
(Continued)

(52) U.S. Cl.
CPC .......... *H04L 9/3247* (2013.01); *G06F 21/16* (2013.01); *H04L 9/3242* (2013.01); *G06F 21/10* (2013.01); *H04L 2209/38* (2013.01)

(58) Field of Classification Search
CPC ......... G06F 21/10; G06F 21/16; H04L 9/3247
See application file for complete search history.

(56) References Cited

U.S. PATENT DOCUMENTS

2005/0108548 A1  5/2005 Ohta
2005/0177466 A1  8/2005 Willins
(Continued)

FOREIGN PATENT DOCUMENTS

JP    H103256 A     1/1998
JP    2003063535 A  3/2003
(Continued)

OTHER PUBLICATIONS

International Search Report and Written Opinion—PCT/US2011/052783—ISA/EPO—dated Feb. 14, 2012.
(Continued)

*Primary Examiner* — Jeffrey Pwu
*Assistant Examiner* — Thong Truong
(74) *Attorney, Agent, or Firm* — Loza & Loza, LLP

(57) ABSTRACT

A system is provided for inside-to-outside or outside-to-inside cryptographic coding that facilitates product authentication along a distribution channel. An association of authenticated, secured codes is generated between inner items (e.g., pharmaceutical doses such as pills, capsules, tablets) and outer items (e.g., packaging containing inner items). For instance, an inner code associated with a first item is used to generate (at least partially) an outer code associated with a second item that contains one or more first items. This process may be repeated multiple times with codes for outer items being a function of codes for inner items. The sequence of items may be authenticated by the dependent relationship between their codes.

25 Claims, 18 Drawing Sheets

(51) Int. Cl.
*G06F 21/16* (2013.01)
*G06F 21/10* (2013.01)

(56) References Cited

U.S. PATENT DOCUMENTS

| | | | |
|---|---|---|---|
| 2007/0106897 A1 | 5/2007 | Kulakowski | |
| 2007/0219916 A1* | 9/2007 | Lucas | G06Q 10/08 705/58 |
| 2008/0065662 A1 | 3/2008 | Stewart et al. | |
| 2008/0253560 A1* | 10/2008 | Grant | G06Q 30/06 380/28 |
| 2010/0070448 A1 | 3/2010 | Omoigui | |
| 2010/0289627 A1 | 11/2010 | McAllister et al. | |
| 2012/0069992 A1 | 3/2012 | Jozwiak et al. | |

FOREIGN PATENT DOCUMENTS

| | | | | |
|---|---|---|---|---|
| JP | 2003267555 A | 9/2003 | | |
| JP | 2004342097 A | 12/2004 | | |
| JP | 2005128666 A | 5/2005 | | |
| JP | 2005130702 A | 5/2005 | | |
| JP | 2005132058 A | 5/2005 | | |
| JP | 2005167977 A | 6/2005 | | |
| JP | 2005517323 A | 6/2005 | | |
| JP | 2007507778 A | 3/2007 | | |
| JP | 2008260592 A | 10/2008 | | |
| JP | 2008279060 A | 11/2008 | | |
| JP | 2008282274 A | 11/2008 | | |
| JP | 2008542916 A | 11/2008 | | |
| JP | 2009040558 A | 2/2009 | | |
| JP | 2010081039 | 4/2010 | | |
| KR | 20040094061 A | 11/2004 | | |
| KR | 20060020730 A | 3/2006 | | |
| KR | 20100057491 A | 5/2010 | | |
| WO | WO2006/092544 A1 * | 9/2006 | | G06F 21/16 |
| WO | WO-2006130444 A2 | 12/2006 | | |
| WO | WO-2010136230 A1 | 12/2010 | | |

OTHER PUBLICATIONS

Supplementary European Search Report—EP11773334—Search Authority—Munich—dated Jul. 17, 2017.

* cited by examiner

| Hierarchy Level (400) | Hierarchy of Items (402) | Code Hierarchy (404) | Cryptographic Forgery Resistant Tag (406) |
|---|---|---|---|
| N+3 | Pallet | $Code_{pallet}$ | $SIG_{PrvK}(Code_{pallet})$ |
| N+2 | Box | $Code_{box}$ | $SIG_{PrvK}(Code_{box})$ |
| N+1 | Container | $Code_{container}$ | $SIG_{PrvK}(Code_{container})$ |
| N | Dose | $Code_{dose}$ | $SIG_{PrvK}(Code_{dose})$ |

Top ↑ — Bottom

408 — Inside-to-Outside Authentication

Item $Code_{N+3}$: $Code_{N+2}$, $Params_{N+3}$, $SIG_{PrvK}(Code_{N+3})$
Item $Code_{N+2}$: $Code_{N+1}$, $Params_{N+2}$, $SIG_{PrvK}(Code_{N+2})$
Item $Code_{N+1}$: $Code_{N}$, $Params_{N+1}$, $SIG_{PrvK}(Code_{N+1})$
Item $Code_{N}$: $Params_{N}$, $SIG_{PrvK}(Code_{N})$ 410 — Outside-to-Inside Authentication Item $Code_{N+3}$: $Params_{N+3}$, $SIG_{PrvK}(Code_{N+3})$
Item $Code_{N+2}$: $Code_{N+3}$, $Params_{N+2}$, $SIG_{PrvK}(Code_{N+2})$
Item $Code_{N+1}$: $Code_{N+2}$, $Params_{N+1}$, $SIG_{PrvK}(Code_{N+1})$
Item $Code_{N}$: $Code_{N+1}$, $Params_{N}$, $SIG_{PrvK}(Code_{N})$ Manufacturer Root Keys: $PubK_{Root}/PrvK_{Root}$ — 412

Date-Specific or Product-Specific Keys: $PubK_A/PrvK_A$ (414), $PubK_B/PrvK_B$ (416)

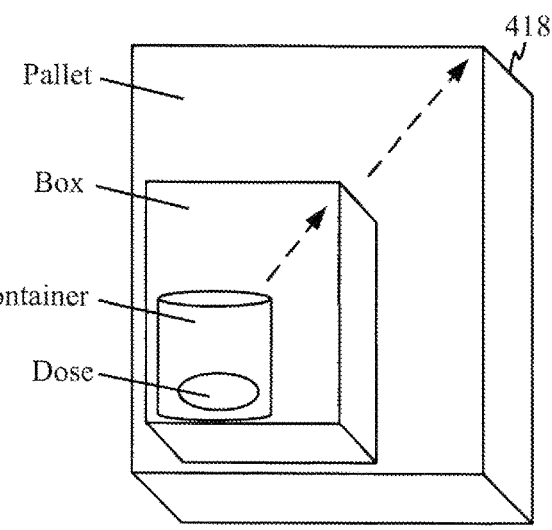

FIG. 4

*INSIDE-TO-OUTSIDE CRYPTOGRAPHIC CODE GENERATION*

PRODUCT AUTHENTICATION USING END-TO-END CRYPTOGRAPHIC SCHEME

CROSS-REFERENCE TO RELATED APPLICATIONS

This application is a divisional of prior application Ser. No. 12/888,231, filed Sep. 22, 2010, which application is incorporated by reference herein.

BACKGROUND

Field

At least one feature relates to methods and/or apparatus for the protection of products during distribution, and more particularly, to inhibit counterfeiting and/or forgery of said products during distribution.

Background

The pharmaceutical industry is sensitive to many threats, including, but not limited to, the distribution of counterfeit, expired, and/or tampered pharmaceutical products. Such counterfeit, expired, and/or tampered pharmaceutical products may be introduced between the manufacturer and retailer, for example, along a distribution channel. That is, in the chain of distribution and/or sales of pharmaceutical products, the risk exists for expired, counterfeit, and/or ineffective products (e.g., medicine in the form of pills, tablets, syrups, etc.). This problem is not limited to just pharmaceutical products but may also be present in the distribution of other types of products.

Some prior art approaches address this problem by adding coded data on the surface of a product that identifies the product. This data can be read by a scanner to identify the product. Other techniques applied to pharmaceutical products may use microscopic labels (often only to packages in bulk, not individual doses) or chemical tracers. The latter can be detected with expensive forensic equipment.

However, these prior art approaches fail to recognize that any such coded data may be replicated on a forged product. Additionally, these prior art approaches fail to provide a way to identify at what stage of the distribution channel a forgery may have been introduced. These prior art techniques allow for the inclusion of free-formed, encrypted, authenticated information as to a product's origin, composition, destination, etc.

Therefore, a way is needed to inhibit or prevent forged products from being introduced within a distribution channel.

SUMMARY

In one aspect, a method for authenticating a first item based on a hierarchy of codes is provided. A first item code is obtained from the first item. Then a second item code is obtained from a second item, where the second item either contains or is contained by the first item. The first item may be authenticated by using the second item code, wherein the first item is successfully authenticated if a cryptographic relationship between the first item code and the second item code is verified.

In another aspect, an apparatus adapted to authenticate a first item based on a hierarchy of codes includes an input device adapted to obtain a first item code from the first item and obtain a second item code from a second item, where the second item either contains or is contained by the first item. The apparatus further includes a processing circuit coupled to the input device, the processing circuit adapted to authenticate the first item by using the second item code, wherein the first item is successfully authenticated if a cryptographic relationship between the first item code and the second item code is verified.

In another aspect, an apparatus adapted to authenticate a first item based on a hierarchy of codes includes means for obtaining a first item code from the first item, means for obtaining a second item code from a second item, where the second item either contains or is contained by the first item, and means for authenticating the first item by using the second item code, wherein the first item is successfully authenticated if a cryptographic relationship between the first item code and the second item code is verified.

In another aspect, a machine-readable medium comprising instructions for authenticating a first item based on a hierarchy of codes, which when executed by a processor causes the processor to obtain a first item code from the first item, obtain a second item code from a second item, where the second item either contains or is contained by the first item, and authenticate the first item by using the second item code, wherein the first item is successfully authenticated if a cryptographic relationship between the first item code and the second item code is verified.

BRIEF DESCRIPTION OF THE DRAWINGS

FIG. 4 illustrates two types of end-to-end authentication schemes using cryptographic forgery resistant tags and hierarchical dependencies.

FIG. 5, comprising

FIG. 6, comprising

FIG. 9, comprising

FIG. 10, comprising

DETAILED DESCRIPTION

Figure 1:
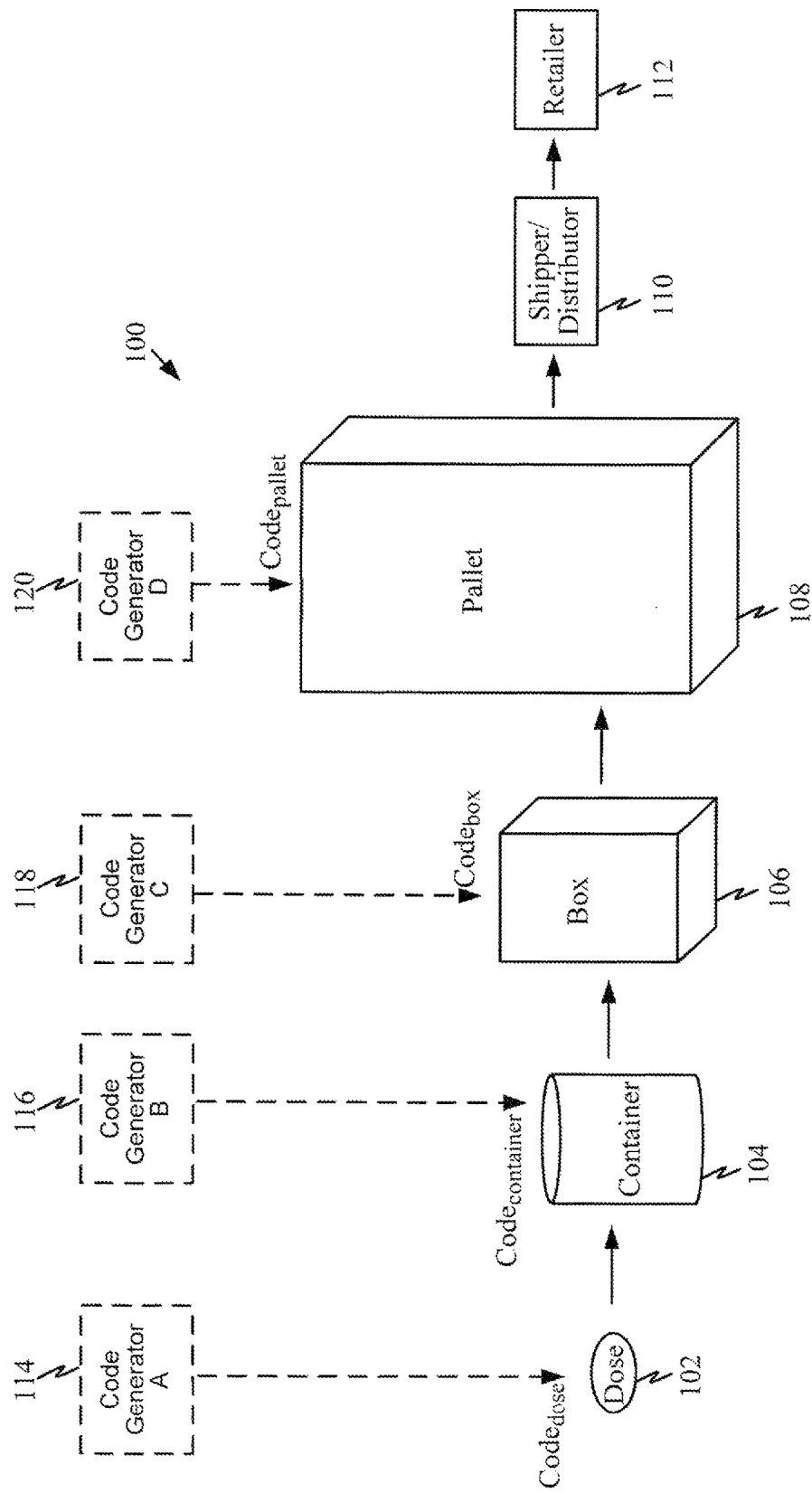
FIG. 1 illustrates an exemplary distribution channel for pharmaceuticals in which end-to-end (e.g., inside-to-outside or outside-to-inside) authentication may be implemented to inhibit counterfeiting of pharmaceuticals.

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Overview

According to one feature, a system is provided for inside-to-outside or outside-to-inside cryptographic coding that facilitates product authentication along a distribution channel. An association of authenticated, secured codes is generated between inner items (e.g., pharmaceutical doses such as pills, capsules, tablets) and outer items (e.g., packaging containing inner items). For instance, an inner code associated with a first item is used to generate (at least partially) an outer code associated with a second item that contains one or more first items. This process may be repeated multiple times with codes for outer items being a function of codes for inner items. The sequence of items may be authenticated by the dependent relationship between their codes.

In an alternative implementation, an outer code associated with a first item is used to generate (at least partially) an inner code associated with one or more second items that are contained within the first item. This process may be repeated multiple times with inner codes for inner items being a function of outer codes for outer items. The sequence of items may be authenticated by the dependent relationship between their codes.

Forgery or counterfeiting of these items is thwarted or inhibited by virtue of the dependent relationship between their codes. For a forger or counterfeiter to replicate a particular item (e.g., pharmaceutical pills, tablets, etc.), the whole sequence of codes (e.g., from inner items to outer items) has be forged. Because each item may be associated with a different sequence of codes, a forger cannot merely copy one set of authentic codes. That is, some codes (e.g., outer codes used for pallets) may be associated with a particular destination or retailer, so a forged product shipment can be detected if the outer code and the sequence of codes do not match the particular destination or retailer. Additionally, outer codes (e.g., codes used for pallets) may be tracked (e.g., recorded in a database) at the destination or retailer so that they can only be used once. Any subsequent detection of an outer code that was previously detected may be considered a forgery or counterfeit item or product. For example, at a port of entry in the distribution channel, a customs agent may verify one or more codes on pallets and/or other items therein to determine whether they have been previously detected. If the same code(s) has been previously detected, this may indicate that forgery of a pallet and/or items therein.

Product Authentication System

The pharmaceutical industry and their customers are sensitive to many threads, including, but not limited to, distribution of medicines after expiration and counterfeit of pharmaceutical substances. Some security measures used to protect products may be bypassed by obtaining an authentic version of a product and copying, forging, and/or replicating the security measure. This may allow a large number of forged pharmaceuticals or other products to be introduced into the market and/or distributed as legitimate.

FIG. 1 illustrates an exemplary distribution channel for pharmaceuticals in which end-to-end (e.g., inside-to-outside or outside-to-inside) authentication may be implemented to inhibit counterfeiting of pharmaceuticals. In this pharmaceutical distribution system 100, a plurality of pharmaceutical doses 102 (e.g., one or more pills, capsules, tablets, etc.) are manufactured and may be stored in a container 104 (e.g., bottle or individual package). A plurality of containers 104 may then be packaged into a box 106. A plurality of boxes 106 may then be packaged into a pallet 108 for distribution, e.g., by a shipper or distributor 110 to one or more retailers 112.

To protect pharmaceuticals from counterfeiting, forgery, and/or tampering, a cryptographic security measure is implemented in which codes are generated based on an end-to-end association between inner and outer items.

The terms "inner code" and "outer code" refer to codes or identifiers used on items or products to identify such items or products or characteristics associated with such items or products, where the inner code is physically and/or logically associated with a first item or product that is inside or within a second item or product that is physically and/or logically associated with the outer code. Therefore, the terms "inner code" and "outer code" imply a relative relationship between the items or products with which those codes are associated.

Referring again to FIG. 1, one or more code generators 114, 116, 118, and/or 120 may be used to generate codes that are appended to the dose 102, container 104, box 106, and/or pallet 108, respectively. Forgery or counterfeiting relies on economies of scales, i.e., being able to take one authentic product, replicate it, and pass it off as an authentic product. However, the end-to-end code associations described herein inhibit such economies of scale by preventing reuse of the same associations (e.g., sequences of codes) on multiple instances of the same products or items (e.g., pharmaceuticals).

Inside-to-Outside Product Authentication System

Figure 2:
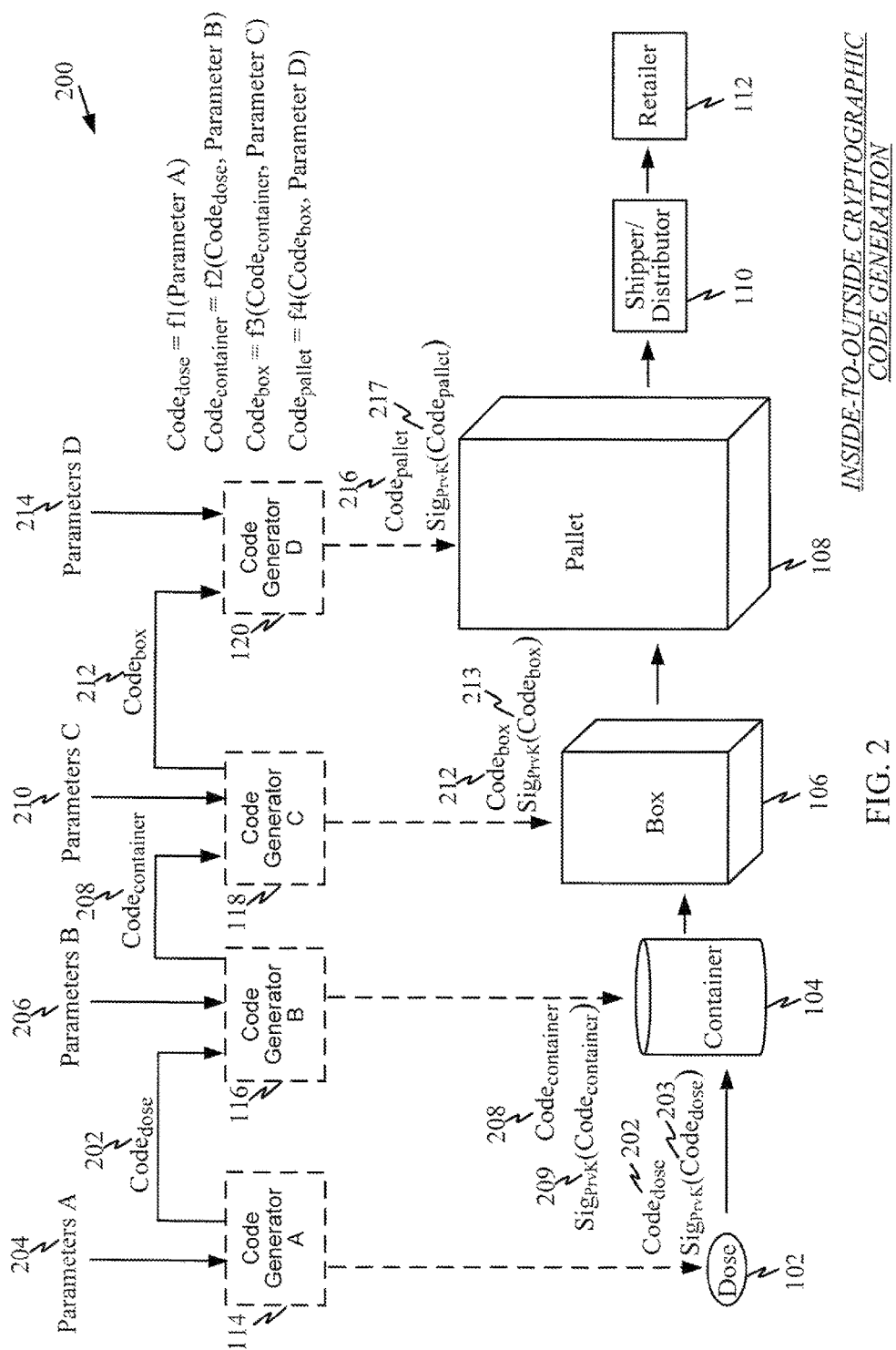
FIG. 2 illustrates an example of an inside-to-outside cryptographic security scheme in which inner codes are used to generate (at least partially) outer codes.

FIG. 2 illustrates an example of an inside-to-outside cryptographic security scheme in which inner codes are used to generate (at least partially) outer codes. This inside-to-outside cryptographic security scheme may also be referred to as a bottom-to-top coding scheme or a multi-layer recursive coding scheme. Generally, an end-to-end association between items (e.g., doses, containers, boxes, pallets, etc.) may be generated so that outer codes are dependent on inner codes. To authenticate these codes, a public-private key pair may be used, where each code is bound (e.g., sign) with a private key and a cryptographic hash function to generate a forgery resistant tag (e.g., a cryptographic signature). A property of the public-private key pair is that the forgery resistant tag (e.g., cryptographic signature) is only decodable using the corresponding public key. The public key may be delivered with the code or it may be independently delivered, e.g., from a trusted source. Consequently, forgery is inhibited due to the dependency between the end-to-end codes and the use of forgery resistant tags (e.g., cryptographic signatures) for each code. In some implementations, a well-known Public Key Infrastructure may be used for verification of the various forgery resistant tags (e.g., signatures).

For example, a first code generator A 114 may generate a first code ($Code_{dose}$ 202) that is based on one or more parameters A 204, which may include a manufacturer code, a manufacturing date, a product/dose identifier, etc. That is, $Code_{dose}$ 202 may be a function f1 of, or equal to, the one or more parameters A 204. This $Code_{dose}$ 202 may be appended to the dose 102.

Because of the limited size of individual pharmaceutical doses (e.g., pills, capsules, or tablets), a bit-efficient cryptographic technique may be used to generate $Code_{dose}$ 202. That is, due to the small size of the dose 102, the $Code_{dose}$ 202 may be small. In some cases, the $Code_{dose}$ 202 may be the same code for all doses 102 of a particular type. For example, all doses 102 (e.g., pills) in a particular container 104 may have the same $Code_{dose}$ 202 if all doses are nominally the same. For example, during manufacture, a $Code_{dose}$ 202 may be generated based on the dose 120 date of manufacture, composition, lot number, product identifier and/or other information associated with the product and/or manufacturer. The $Code_{dose}$ 202 may then be added or appended, e.g., as a bar code or other form of representation, onto the dose 102. Additionally, in order to protect $Code_{dose}$ 202 from forgers or counterfeiters, it is bound (e.g., signed) using a private key (PrvK) and cryptographic hash function to generate a first forgery resistant tag, such as a first cryptographic signature $Sig_{PrvK}(Code_{dose})$ 203. This first forgery resistant tag (first cryptographic signature) $Sig_{PrvK}(Code_{dose})$ 203 may also be appended to the dose 102. The $Code_{dose}$ 202 may be subsequently authenticated by verifying the first forgery resistant tag (first cryptographic signature) $Sig_{PrvK}(Code_{dose})$ 203 using the corresponding public key.

A plurality of doses 102 may then be packaged into the container 104. Such container 104 may be a bag, bottle, tablet pack, etc. A second code generator B 116 may generate a second code ($Code_{container}$ 208) that is based on the $Code_{dose}$ 202 and, optionally, one or more parameters B 206. The one or more parameters B 206 may include a manufacturer code, a manufacturing date, a product/dose identifier, a container size, etc. That is, $Code_{container}$ 208 may be a function f2 of, or equal to, the $Code_{dose}$ 202 and the one or more parameters B 206. Additionally, in order to protect $Code_{container}$ 208 from forgers or counterfeiters, it may be bound (e.g., signed) using the private key (PrvK) and the cryptographic hash function to generate a second forgery resistant tag, such as a second cryptographic signature $Sig_{PrvK}(Code_{container})$ 209. This $Code_{container}$ 208 may be appended to the container 104 for subsequent authentication. The second forgery resistant tag (second cryptographic signature) $Sig_{PrvK}(Code_{container})$ 209 may also be appended to the container 104. The $Code_{container}$ 208 may be subsequently authenticated by verifying the second forgery resistant tag (second cryptographic signature) $Sig_{PrvK}(Code_{container})$ 209 using the corresponding public key.

Typically, containers 104 are not shipped individually from the manufacturer. Instead, a plurality of containers 104 may be packaged into the box 106. A third code generator C 118 may generate a third code ($Code_{box}$ 212) that is based on the $Code_{container}$ 208 and, optionally, one or more parameters C 210. The one or more parameters C 210 may include a manufacturer/packager code or public key, a manufacturing/packaging date, a dose identifier, a container/box size, etc. That is, $Code_{box}$ 212 may be a function f3 of, or equal to, the $Code_{container}$ 208 and one or more parameters C 210. Additionally, in order to protect $Code_{box}$ 212 from forgers or counterfeiters, it may be bound (e.g., signed) using the private key (PrvK) and the cryptographic hash function to generate a third forgery resistant tag, such as a third cryptographic signature $Sig_{PrvK}(Code_{box})$ 213. The $Code_{box}$ 212 and third forgery resistant tag (third cryptographic signature) $Sig_{PrvK}(Code_{box})$ 213 may be appended to the box 106 for subsequent authentication. The $Code_{box}$ 212 may be subsequently authenticated by verifying the third forgery resistant tag (third cryptographic signature) $Sig_{PrvK}(Code_{container})$ 213 using the corresponding public key.

For purposes of shipment and/or distribution, a plurality of boxes 106 may be packaged into the pallet 108. A fourth code generator D 120 may generate a fourth code ($Code_{pallet}$ 216) that is based on the $Code_{box}$ 212 and, optionally, one or more parameters D 214. The one or more parameters D 214 may also include a manufacturer/packager code or public key, a manufacturing/packaging date, a dose identifier, a container/box size, etc. That is, $Code_{pallet}$ 216 may be a function f4 of, or equal to, the $Code_{box}$ 212 and the one or more parameters D 214. Additionally, in order to protect $Code_{pallet}$ 216 from forgers or counterfeiters, it may be bound (e.g., signed) using the private key (PrvK) and the cryptographic hash function to generate a fourth forgery resistant tag, such as a fourth cryptographic signature $Sig_{PrvK}(Code_{pallet})$ 216. The $Code_{pallet}$ 216 and fourth forgery resistant tag (fourth cryptographic signature) $Sig_{PrvK}(Code_{pallet})$ 217 may be appended to the pallet 108 for subsequent authentication. The $Code_{pallet}$ 216 may be subsequently authenticated by verifying the fourth forgery resistant tag (fourth cryptographic signature) $Sig_{PrvK}(Code_{pallet})$ 217 using the corresponding public key.

Because there is a dependency among the codes (e.g., $Code_{dose}$ 202, $Code_{container}$ 208, $Code_{box}$ 212, and $Code_{pallet}$ 216) used for the smallest dose 102 to the largest package size (pallet 108), the end-to-end relationship of a pharmaceutical product (e.g., from dose to pallet) can be verified along its distribution channel using the appended codes, e.g., at the shipper/distributor 110 or at the retailer 112. Additionally, the authenticity of the appended codes may be verified using the forgery resistant tags appended with the codes. For example, a distributor or customs agent may check a pallet 108 to ascertain the authenticity of the pharmaceutical products therein. The authenticity of a pallet 108 may be verified by determining whether $Code_{pallet}$ 216 is based on (or identifies) $Code_{box}$ 212 and/or Parameters D 214 and authenticating $Code_{pallet}$ 216 using the fourth forgery resistant code (fourth cryptographic signature) $Sig_{PrvK}(Code_{pallet})$ 217. Similarly, the authenticity of the box 106 may be verified by determining whether $Code_{box}$ 212 is based on (or identifies) $Code_{container}$ 208 and/or Parameters C 210 and authenticating $Code_{box}$ 212 using the third forgery resistant code (third cryptographic signature) $Sig_{PrvK}(Code_{box})$ 213. The authenticity of a container 104 may be similarly verified by determining whether $Code_{container}$ 208 is based on (or identifies) $Code_{dose}$ 202 and/or Parameters B 206 and authenticating $Code_{container}$ 208 using the second forgery resistant code (second cryptographic signature) $Sig_{PrvK}(Code_{container})$ 208. Lastly, the first code $Code_{dose}$ 202 may be authenticated using the first forgery resistant code (first cryptographic signature) $Sig_{PrvK}(Code_{dose})$ 203.

If at any stage the dependency between an inner code and an outer code cannot be verified or the code authenticated, then authentication fails.

Figure 3:
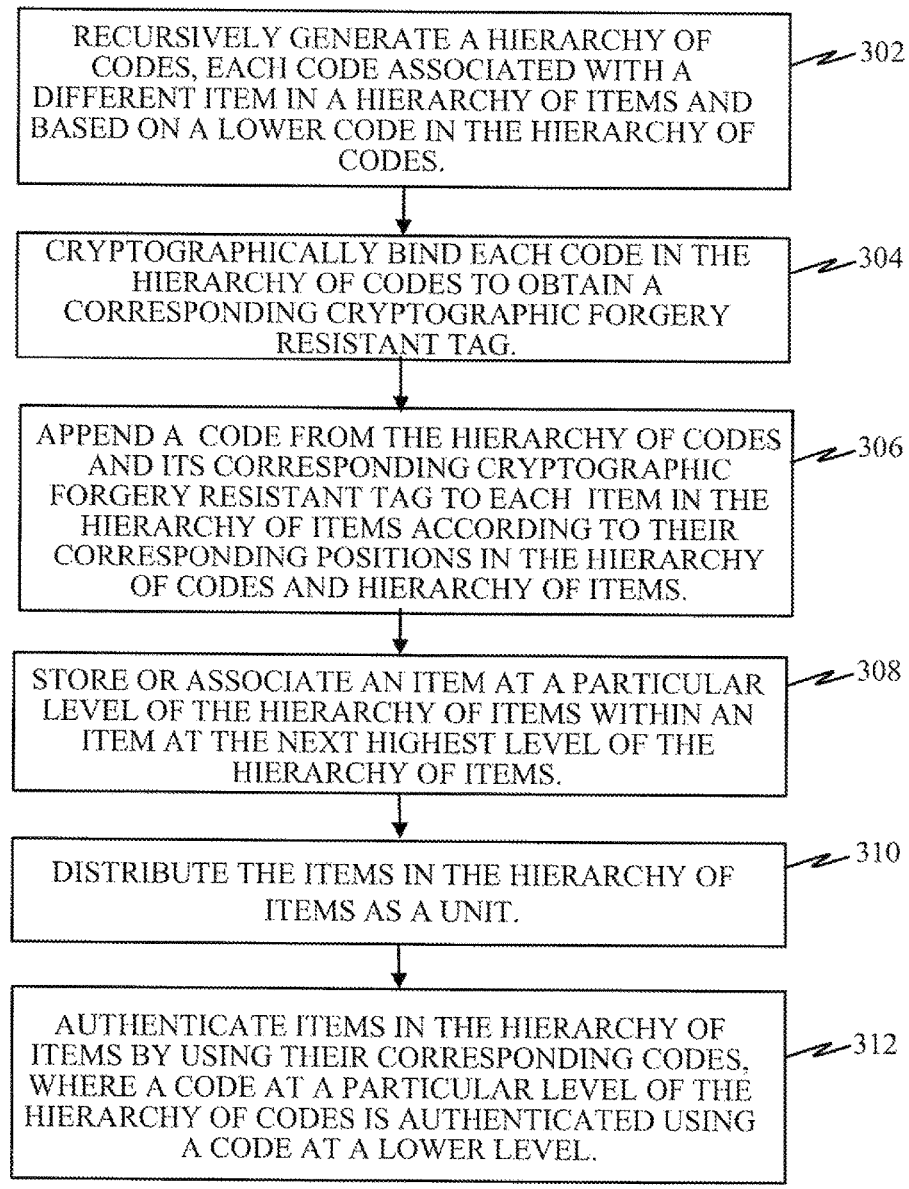
FIG. 3 illustrates an inside-to-outside cryptographic coding method for end-to-end product or item authentication.

FIG. 3 illustrates an inside-to-outside cryptographic coding method for end-to-end product or item authentication. A hierarchy of codes may be recursively generated, where each code is associated with a different item in a hierarchy of items and is based on a lower code in the hierarchy of codes 302. For example, the hierarchy of codes may include codes $Code_{dose}$ 202, $Code_{container}$ 208, $Code_{box}$ 212, and $Code_{pallet}$ 216 (in that order), where $Code_{dose}$ 202 is at the lowest level of the hierarchy and $Code_{pallet}$ 216 is at the highest level of the hierarchy. Similarly, the corresponding hierarchy of items may include items dose 102, container 104, box 106, and pallet 108 (in that order), where dose 102 is at the lowest level of the hierarchy and pallet 108 is at the highest level of the hierarchy. Consequently, $Code_{pallet}$ 216 is a function of $Code_{box}$ 212, $Code_{box}$ 212 is a function of $Code_{container}$ 208, $Code_{container}$ 208 is a function of $Code_{dose}$ 202. Each code in the hierarchy of codes is cryptographically bound to other codes and/or parameters to obtain a cryptographic forgery resistant tag 304.

A code from the hierarchy of codes and its corresponding cryptographic forgery resistant tag are appended to each item in the hierarchy of items according to their corresponding positions in the hierarchy of codes and hierarchy of items 306. For example, $Code_{dose}$ 202 and $Sig(Code_{dose})$ 203 are appended to dose 102, $Code_{container}$ 208 and $Sig(Code_{container})$ 209 are appended to container 104, $Code_{box}$ 212 and $Sig(Code_{box})$ 213 are appended to box 106, and $Code_{pallet}$ 216 and $Sig(Code_{pallet})$ 217 are appended to pallet 108. A "corresponding position" in the hierarchy of codes and hierarchy of items means that a code at a level K of the hierarchy of codes corresponds to (or belongs to) an item at the same level K of the hierarchy of items.

An item at a particular level of the hierarchy of items is stored within, or associated with, an item at the next highest level of the hierarchy of items 308. For example, one or more doses 102 are stored within a container 104, one or more containers 104 are stored within a box 106, and one or more boxes are stored within a pallet 108.

The items in the hierarchy of items may then be distributed as a unit 310. For instance, the pallet 108 (containing the doses 102, containers 104 and/or boxes 106) may be sent over a distribution channel.

Subsequently, at a retailer, destination or checkpoint, items in the hierarchy of items may be authenticated using their corresponding codes, where a code at a particular level of the hierarchy of codes is authenticated using a code at a lower level of the hierarchy of codes 312. That is, the shipped unit (e.g., pallet 108) may be authenticated by verifying or authenticating $Code_{pallet}$ 216 based on $Code_{box}$ 212, authenticating $Code_{box}$ 212 based on $Code_{container}$ 208, and authenticating $Code_{container}$ 208 based on $Code_{dose}$ 202. Each code may also be authenticated by using its corresponding cryptographic forgery resistant tag (e.g., signature included with the code).

Note that while FIGS. 1 and 2 and other examples herein may illustrate that every item includes an authenticating code, it is also contemplated that some items (e.g., boxes, containers, etc.) may not be coded or used for authentication. However, such non-coded items are excluded from the hierarchy of items.

FIG. 4 illustrates two types of end-to-end authentication schemes using cryptographic forgery resistant tags and hierarchical dependencies. In one example, a hierarchy of items may include doses inside a container, containers inside a box, and boxes inside a pallet. A hierarchy of codes 404 may include multiple codes ($Code_{pallet}$, $Code_{box}$, $Code_{container}$, and $Code_{dose}$), each code is associated with a corresponding item at the same hierarchical level of the hierarchy of items 402. Additionally, each code may have an associated cryptographic forgery resistant tag 406 used to authenticate the code.

In an inside-to-outside authentication scheme 408, a code identifying an inner item (e.g., an item lower on the hierarchy) is used to generate codes identifying an outer item (e.g., an item higher in the hierarchy). For example, at a level N+1, item $Code_{N+1}$ may identify a code ($Code_N$) at the next lowest level, (optionally) one or more parameters $Params_{N+1}$ associated with the item at the particular hierarchical level, and a cryptographic forgery resistant tag (e.g., cryptographic signature $Sig_{PrvK}(Code_{N+1})$ of $Code_{N+1}$. This is repeated across multiple levels to create an end-to-end association between items.

In an outside-to-inside verification scheme 410, a code identifying an outer item (e.g., an item higher on the hierarchy) is used to generate codes identifying an inner item (e.g., an item lower in the hierarchy). For example, at a level N+1, item $Code_{N+1}$ may identify a code ($Code_{N+2}$) at the next highest level, (optionally) one or more parameters $Params_{N+1}$ associated with the item at the particular hierarchical level, and a cryptographic forgery resistant tag (e.g., cryptographic signature $Sig_{PrvK}(Code_{N+1})$) of $Code_{N+1}$. This is repeated across multiple levels to create an end-to-end association between items.

Note that the cryptographic forgery resistant tags (e.g., signatures) may be generated using a private key (used to generate the signature) having a corresponding public key (used to verify the signature). The public key may be provided with an item (e.g., as part of the code) or it may be obtained from a trusted key provider via independent channels. In some implementations, a manufacturer may have a root key 412 (e.g., root public/private key) that is used to generate date-specific or product specific keys 414 and 416. For instance, during a given period of time, a manufacturer may use a particular public/private key pair for generating and authenticating cryptographic forgery resistant tags. The cryptographic key pair may be subsequently replaced so that any forged product using the old keys would be detected. Alternatively, a manufacturer may use different cryptographic key pairs for different products or types of products.

Additionally, the packaging 418 illustrates how one or more doses are stored within a container, one or more containers are stored within a box, and one or more boxes are stored within a pallet.

Note that while some examples may describe pharmaceutical products being authenticated, the authentication schemes described herein should be broadly construed to cover any type of product or item.

Note also that while FIG. 4 and other examples herein may illustrate that every item includes an authenticating code, it is also contemplated that some items (e.g., boxes, containers, etc.) may not be coded or used for authentication. However, such non-coded items are excluded from the hierarchy of items. Thus, the coded items in a hierarchy of items may be non-sequential or non-contiguous relative to each other (e.g., some items in the hierarchy of items may be enclosed within non-coded items).

In more general terms, the hierarchy of codes may be generated such that each code is associated with a different item in a hierarchy of items and is based on (e.g., is derived from or a function of) either a lower code or a higher code in the hierarchy of codes. While FIG. 4 illustrates a first code hierarchy 408 in which a code is based on the next highest code in the hierarchy and a second hierarchy 410 in which a code is based on the next lowest code in the hierarchy, other types of code hierarchies are also contemplated herein. In general, a code may be based on any higher or lower code in the hierarchy. For example, a particular code in a code hierarchy at a level K may be based on another code at a level K+2 or K−2 of the hierarchy of codes.

According to other implementations, a hierarchy of codes may include a first hierarchy of codes associated with a first party and a second hierarchy of codes associated with a second party, wherein at least one code in the second hierarchy of codes is based on at least one code in the first hierarchy of codes. The forgery resistant tags associated with codes in the first hierarchy of codes may be verifiable using a first public key while codes in the second hierarchy of codes are verifiable using a second public key. In some variations, the first hierarchy of codes In some implementations, the first and second hierarchy of codes may utilize the same cryptographic coding scheme. In other implementations, the first hierarchy of codes may utilize an inside-to-outside cryptographic coding scheme while the second hierarchy of codes may an outside-to-inside cryptographic coding scheme.

According to yet another feature, additional codes may be generated for the hierarchy of codes along a distribution channel. Each additional code may be associated with a different additional item in the hierarchy of items and based on either a lower code or a higher code in the hierarchy of codes. For instance, a first part of the hierarchy of items and/or codes may be generated by a manufacturer while a second part of the hierarchy of items and/or codes may be generated by a distributor along the distribution channel. This may allow different parties to add codes and/or items to the hierarchies using their own private/public keys for authentication or verification.

Moreover, some codes in the hierarchy of codes may be replaced along a distribution channel by generating one or more new codes for the hierarchy of codes. For instance, some items and/or codes of the hierarchy of items and/or codes, respectively, may be generated by a manufacturer. Subsequently, a distributor may wish to repackage some of the items in the hierarchy of items. The distributor may first authenticate the items/codes being replaced to make sure the items are not forged. Then, the distributor may replace some of the items in the hierarchy of items and/or codes in the hierarchy of codes. This may allow different parties to add codes and/or items to the hierarchies using their own private/public keys for authentication or verification. For example, a distributor may repackage a full pallet of items into smaller packages and authenticate the individual smaller packages.

While a hierarchy of codes may be recursively generated, the codes therein need not be concurrently or contemporaneously generated. That is, one or more codes may be generated by, for example, a manufacturer, while other codes may be subsequently generated by a distributor or retailer.

According to yet another feature, a hierarchy of codes may be partially regenerated at a particular point during distribution. For example, a retailer may obtain a pallet of boxes having a plurality of boxes therein. The retailer may maintain the hierarchy of codes up to the boxes but discard the codes for the pallet. Then, the retailer may repackage the boxes into partial-pallets and regenerates the hierarchy of codes to include the partial pallets while maintaining the original codes for the containers and boxes.

Figure 5A:
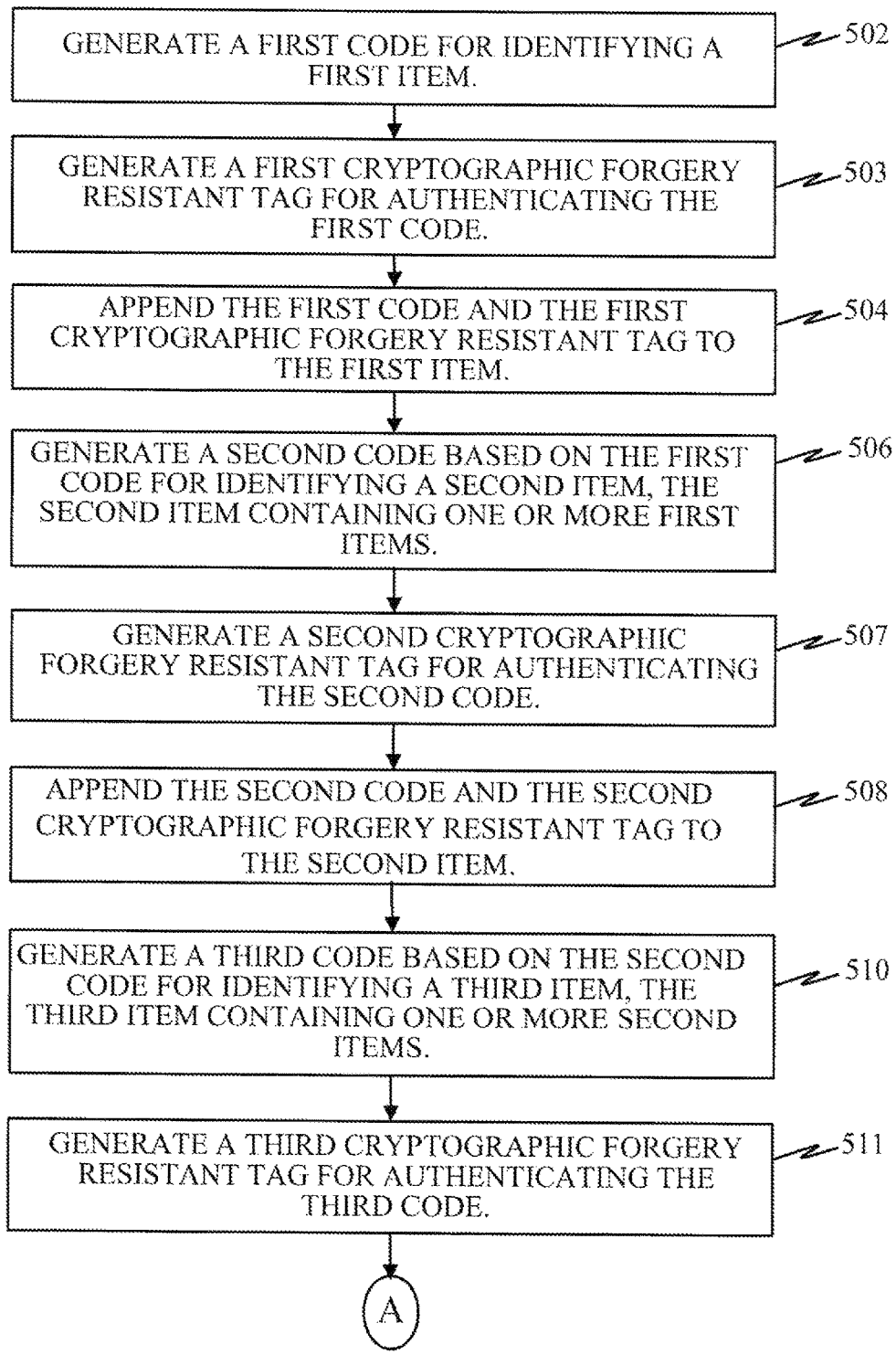
FIGS. 5A and 5B, illustrates a method for inside-to-outside code generation that facilitates end-to-end authentication.
Figure 5B:
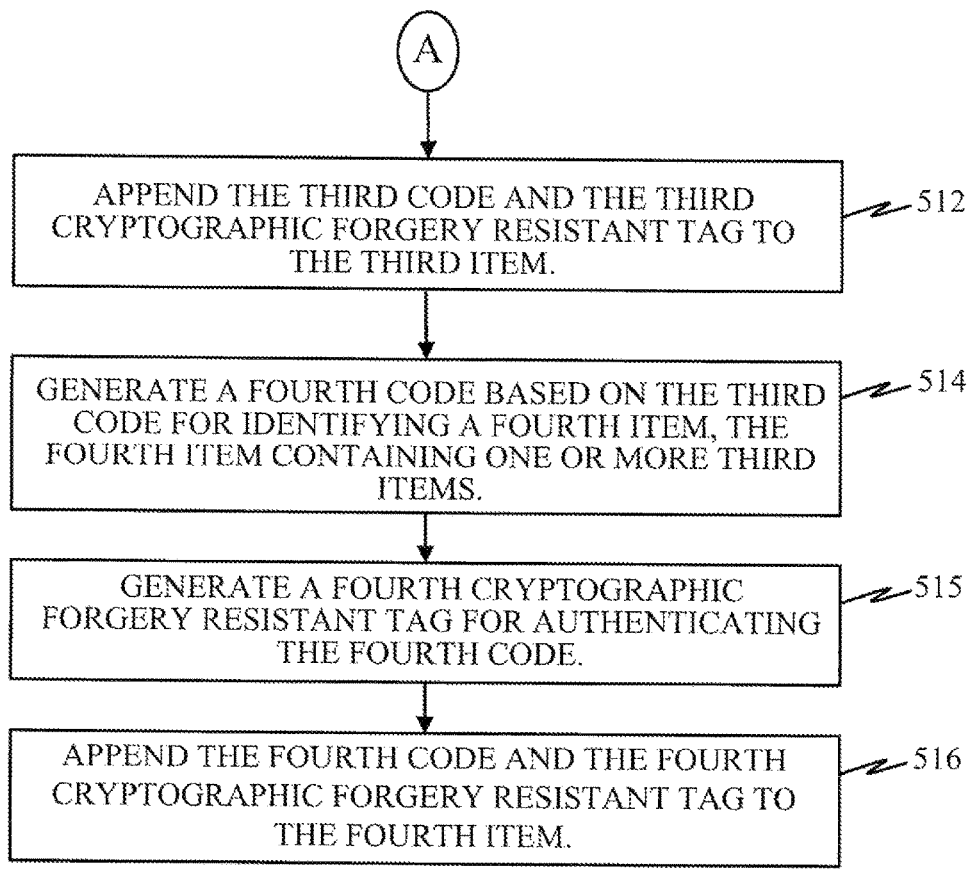

FIG. 5, comprising FIGS. 5A and 5B, illustrates a method for inside-to-outside code generation that facilitates end-to-end authentication. A first code (e.g., product identifier, $Code_{dose}$ 202, etc.) is generated for identifying a first item 502 (e.g., pills or tablets). A first cryptographic forgery resistant tag (e.g., $Sig_{PrvK}(Code_{dose})$ 203) may then be generated for authenticating the first code 503. For instance, the first cryptographic forgery resistant tag may be generated using a private key and a cryptographic function, and is verifiable using a corresponding public key. The first code and first cryptographic forgery resistant tag are then appended to the first item 504.

A second code (e.g., $Code_{container}$ 208) is generated based on the first code for identifying a second item (e.g., container), the second item containing one or more first items 506. For instance, the second code may indicate an association with the first code or a relationship between the second item and the first item. A second cryptographic forgery resistant tag (e.g., $Sig_{PrvK}(Code_{container})$ 209) may then be generated for authenticating the second code 507. For instance, the second cryptographic forgery resistant tag may be generated using the same private key and the cryptographic function, and is verifiable using the corresponding public key. The second code and second cryptographic forgery resistant tag are then appended to the second item 508.

A third code (e.g., $Code_{box}$ 212) is generated based on the second code for identifying a third item (e.g., box), the third item containing one or more second items 510. For instance, the third code may indicate an association with the second code or a relationship between the third item and the second item. A third cryptographic forgery resistant tag (e.g., $Sig_{PrvK}(Code_{box})$ 213) may then be generated for authenticating the third code 511. For instance, the third cryptographic forgery resistant tag may be generated using the same private key and the cryptographic function, and is verifiable using the corresponding public key. The third code and third cryptographic forgery resistant tag are then appended to the third item 512.

A fourth code (e.g., $Code_{pallet}$ 216) is generated based on the third code for authenticating a fourth item (e.g., pallet), the fourth item containing one or more third items 514. For instance, the fourth code may indicate an association with the third code or a relationship between the fourth item and the third item. A fourth cryptographic forgery resistant tag (e.g., $Sig_{PrvK}(Code_{pallet}$ 217) may then be generated for authenticating the fourth code 515. For instance, the fourth cryptographic forgery resistant tag may be generated using the same private key and the cryptographic function, and is verifiable using the corresponding public key. The fourth code and fourth cryptographic forgery resistant tag are then appended to the fourth item 516.

Figure 6A:
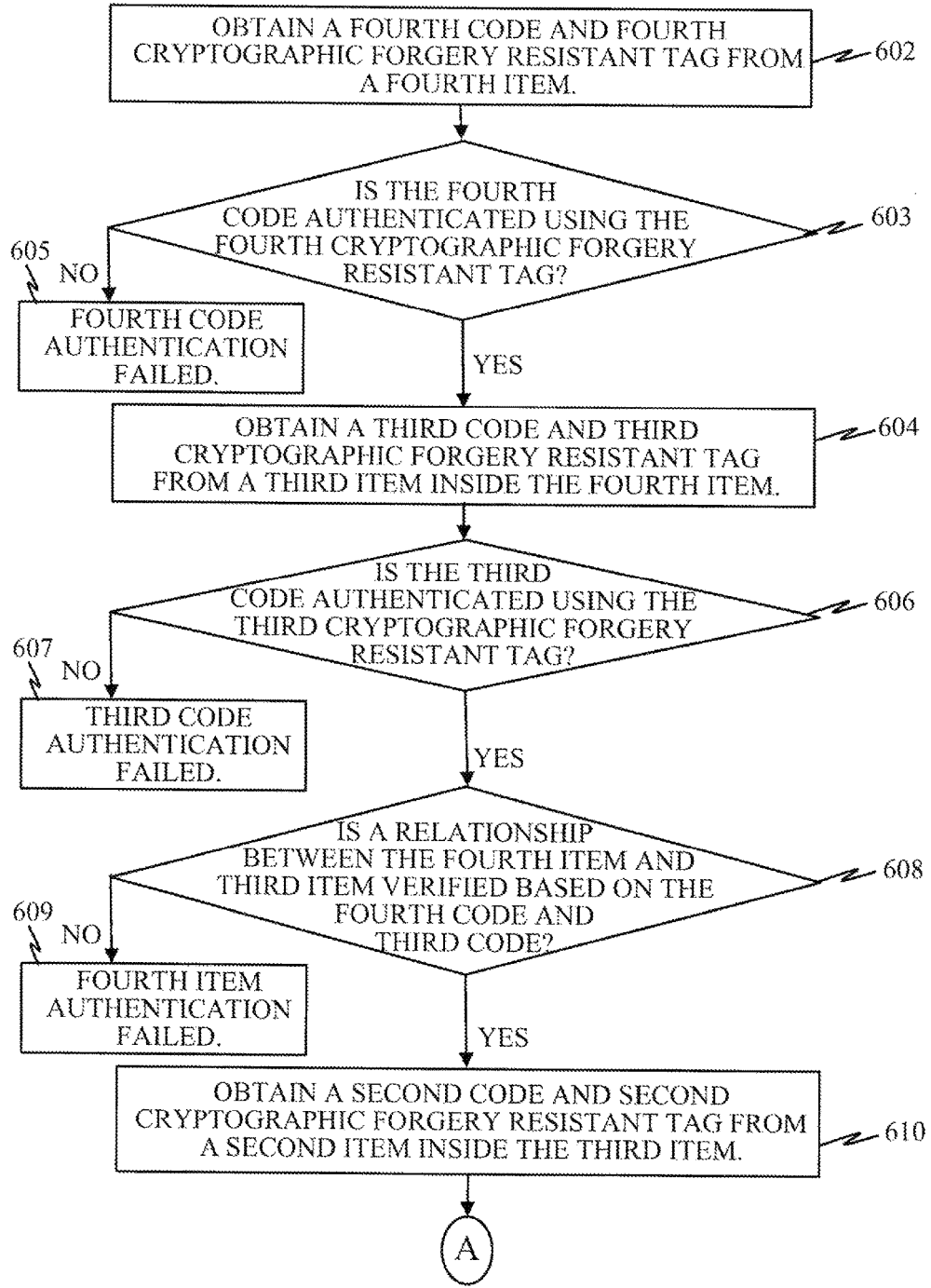
FIGS. 6A and 6B, illustrates a method of authenticating items that have been coded using an inside-to-outside cryptographic coding scheme.
Figure 6B:
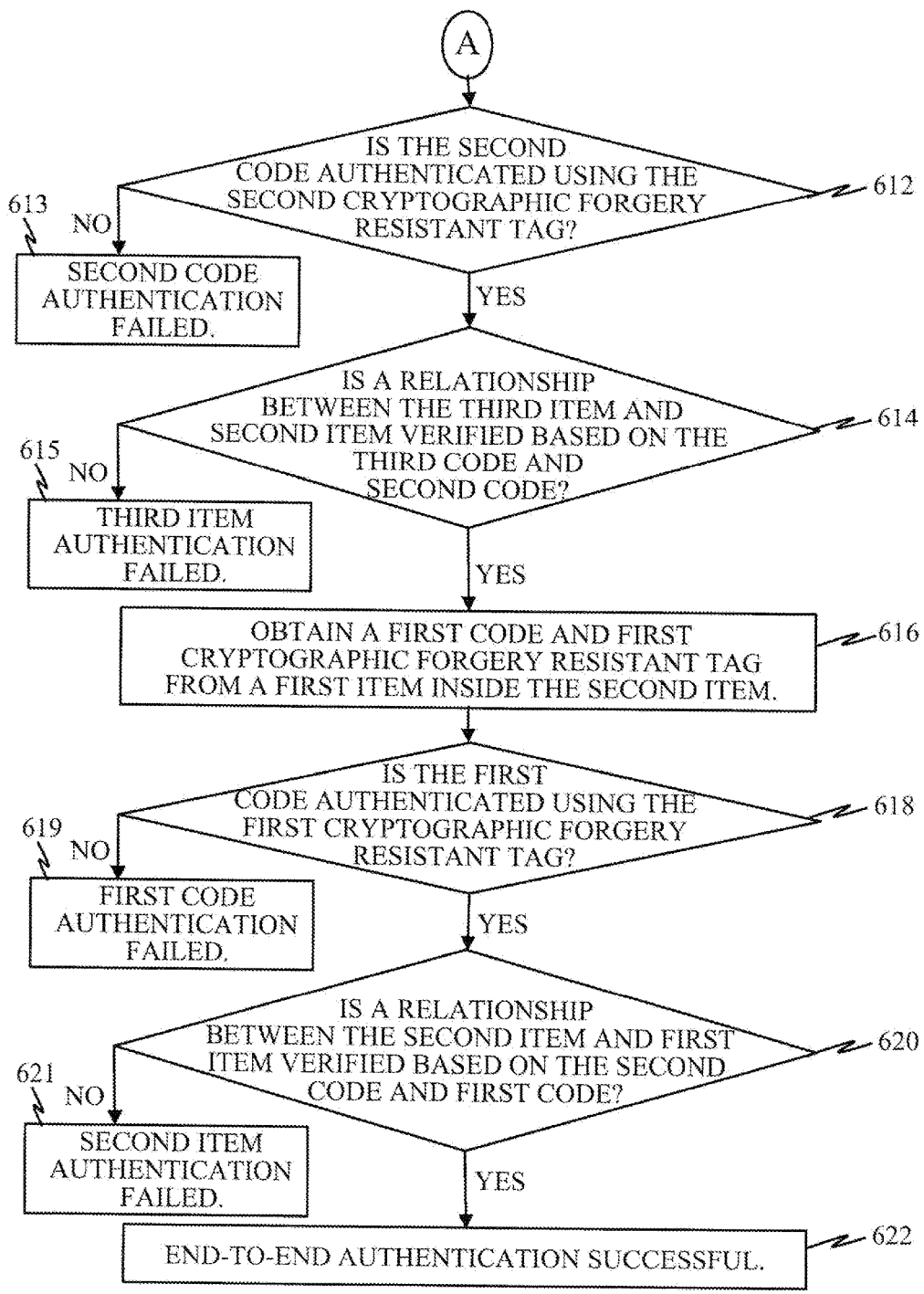

FIG. 6, comprising FIGS. 6A and 6B, illustrates a method of authenticating items that have been coded using an inside-to-outside cryptographic coding scheme. A fourth code (e.g., $Code_{pallet}$ 216) and a fourth forgery resistant tag (e.g., fourth cryptographic signature $Sig_{PrvK}(Code_{pallet})$ 217) are obtained from a fourth item 602. The fourth code may be authenticated using the fourth forgery resistant tag (fourth cryptographic signature) 603. For instance, a public key is used to verify the fourth forgery resistant tag and determine if its content matches the fourth code. Such public key may be obtained from the fourth item itself or may be provided from a manufacturer/packager of the fourth item. If there is no match, then authentication of the fourth code failed 605. Otherwise, the fourth code is successfully authenticated.

A third code (e.g., Code$_{box}$ 212) and a third forgery resistant tag (e.g., third cryptographic signature Sig$_{PrvK}$ (Code$_{box}$) 212) are obtained from a third item inside the fourth item 604. The third code may be authenticated using the third forgery resistant tag 606. For instance, the public key is used to verify the third forgery resistant tag and determine if its content matches the third code. If there is no match, then authentication of the third code failed 607. Otherwise, the third code is successfully authenticated.

A relationship between the fourth item and third item is then verified based on the fourth code and third code 608. That is, because the fourth code is based on (or includes/ identifies) the third code (and possibly other known parameters), an association between the fourth code and third code can be ascertained. If no association between the fourth code and third code can be ascertained (e.g., if the fourth code does not identify the third code), then authentication of the fourth item fails 609. Otherwise, the fourth item is successfully authenticated.

Next, a second code and a second forgery resistant tag (e.g., second cryptographic signature) are obtained from a second item inside the third item 610. The second code may be authenticated using the second forgery resistant tag 611. For instance, the public key is used to verify the second forgery resistant tag and determine if its content matches the second code. If there is no match, then authentication or verification of the second code failed 613. Otherwise, the second code is successfully authenticated.

A relationship between the third item and second item is then verified based on the third code and second code 614. That is, because the third code is based on (or includes/ identifies) the second code (and possibly other known parameters), an association between the third code and second code can be ascertained. If no association between the third code and second code can be ascertained (e.g., if the third code does not identify the second code), then authentication of the third item fails 615. Otherwise, the third item is successfully authenticated.

Similarly, a first code and a first forgery resistant tag (e.g., first cryptographic signature) are obtained from a first item inside the second item 616. The first code may be authenticated using the first forgery resistant tag 618. For instance, the public key is used to verify the first forgery resistant tag and determine if its content matches the first code. If there is no match, then authentication of the first code failed 619. Otherwise, the first code is successfully authenticated.

A relationship between the second item and first item is then verified based on the second code and first code 620. That is, because the second code is based on (or includes/ identifies) the first code (and possibly other known parameters), an association between the second code and first code can be ascertained. If no association between the second code and first code can be ascertained (e.g., if the second code does not identify the first code), then authentication of the second item fails 621. Otherwise, the second item is successfully authenticated and end-to-end authentication established 622.

Outside-to-Inside Product Authentication System

Figure 7:
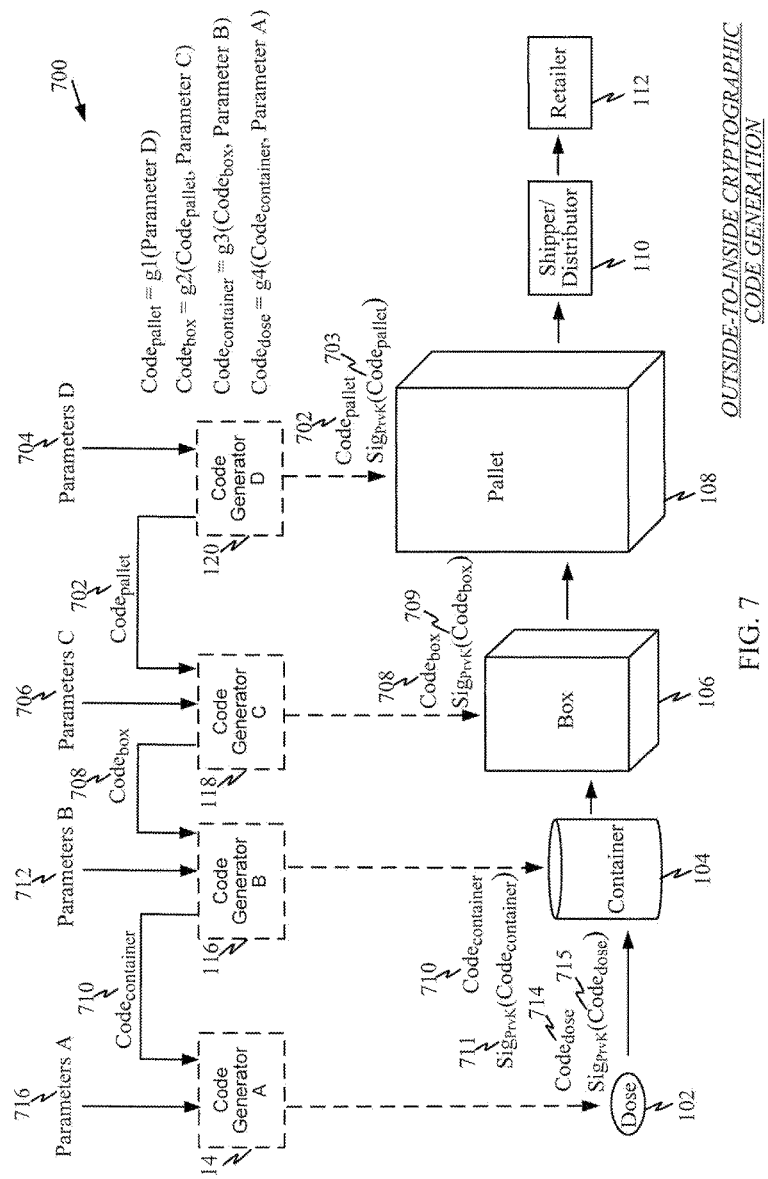
FIG. 7 illustrates an example of an outside-to-inside cryptographic security measure in which outer codes are used to generate (at least partially) inner codes.

FIG. 7 illustrates an example of an outside-to-inside cryptographic security measure in which outer codes are used to generate (at least partially) inner codes. This outside-to-inside cryptographic security scheme may also be referred to as a top-to-bottom coding scheme or a multi-layer recursive coding scheme. Generally, an end-to-end association between items (e.g., doses, containers, boxes, pallets, etc.) may be generated so that inner codes are dependent on outer codes. To authenticate these codes, a public-private key pair may be used, where each code is signed with a private key and a cryptographic hash function to generate a forgery resistant tag (e.g., cryptographic signature). A property of the public-private key pair is that the forgery resistant tag is only verifiable using the corresponding public key. The public key may be delivered with the code or it may be independently delivered, e.g., from a trusted source. Consequently, forgery is inhibited due to the dependency between the end-to-end codes and the use of forgery resistant tags for each code.

In this approach, some information may be known beforehand about the dose, container, box and/or pallet (or manufacturer, packager, etc.) so that inner codes can be associated with outer codes prior to packaging of inner items within outer items. Here, one or more doses 102 are packaged within a container 104, one or more containers 104 are packaged within a box 108, and one or more boxes 106 are packaged within a pallet 108. An outside-to-inside association between codes may mean, for example, that codes or identifiers for smaller units/items are based on codes or identifiers for larger units that contain the smaller units/ items.

For example, the fourth code generator D 120 may generate a first code (Code$_{pallet}$ 702) that is based on one or more parameters D 704, which may include a manufacturer/ packager code, a manufacturing/packaging date, a dose identifier, a container/box size, etc. That is, Code$_{pallet}$ 702 may be a function g1 of, or equal to, the one or more parameters D 704. Additionally, in order to protect Code$_{pallet}$ 702 from forgers or counterfeiters, it may be signed using a private key (PrvK) and a cryptographic hash function to generate a first forgery resistant tag (e.g., first cryptographic signature) Sig$_{PrvK}$(Code$_{pallet}$) 703. The first code Code$_{pallet}$ 702 and first forgery resistant tag Sig$_{PrvK}$(Code$_{pallet}$) 703 may also be appended to the pallet 108. The Code$_{pallet}$) 702 may be subsequently authenticated by verifying the second forgery resistant tag Sig$_{PrvK}$(Code$_{pallet}$) 703 using the corresponding public key.

Next, the third code generator C 118 may generate a second code (Code$_{box}$ 708) that is based on the Code$_{pallet}$ 702 and, optionally, one or more parameters C 706. The one or more parameters C 706 may include a manufacturer/ packager code, a manufacturing/packaging date, a dose identifier, a container/box size, etc. That is, Code$_{box}$ 708 may be a function g2 of, or equal to, the Code$_{pallet}$ 702 and one or more parameters C 706. Additionally, in order to protect Code$_{box}$ 708 from forgers or counterfeiters, it may be signed using the private key (PrvK) and the cryptographic hash function to generate a second forgery resistant tag (e.g., second cryptographic signature) Sig$_{PrvK}$(Code$_{box}$) 709. The second code Code$_{box}$ 708 and second forgery resistant tag (second cryptographic signature) Sig$_{PrvK}$(Code$_{box}$) 709 may be appended to the box 106 for subsequent authentication. The second code Code$_{box}$ 708 may be subsequently authenticated by verifying the second forgery resistant tag Sig$_{PrvK}$ (Code$_{box}$) 709 using the corresponding public key.

The second code generator B 116 may then generate a third code (Code$_{container}$ 710) that is based on the Code$_{box}$ 708 and, optionally, one or more parameters B 712. The one or more parameters B 712 may include a manufacturer code or public key, a manufacturing date, a dose identifier, a container size, etc. That is, the third code Code$_{container}$ 710 may be a function g3 of, or equal to, the second code Code$_{box}$ 708 and the one or more parameters B 712. Additionally, in order to protect Code$_{container}$ 710 from forgers or counterfeiters, it may be signed using the private key (PrvK) and the cryptographic hash function to generate a third forgery resistant tag (e.g., third cryptographic signature) $Sig_{PrvK}(Code_{container})$ 711. The third code $Code_{container}$ 708 and third forgery resistant tag (third cryptographic signature) $Sig_{PrvK}(Code_{container})$ 711 may be appended to the container 104 for subsequent authentication. The third code $Code_{container}$ 710 may be subsequently authenticated by verifying the third forgery resistant tag $Sig_{PrvK}$ $(Code_{container})$ 711 using the corresponding public key.

In one implementation, the first code generator A 114 may generate a fourth code ($Code_{dose}$ 714) that is based on the $Code_{pallet}$ 714 and, optionally, one or more parameters A 716, which may include a manufacturer code or public key, a manufacturing date, a dose identifier, etc. That is, $Code_{dose}$ 714 may be a function g4 of, or equal to, $Code_{dose}$ 714 and the one or more parameters A 716. Additionally, in order to protect $Code_{dose}$ 714 from forgers or counterfeiters, it may be signed using the private key (PrvK) and the cryptographic hash function to generate a fourth forgery resistant tag (e.g., fourth cryptographic signature) $Sig_{PrvK}(Code_{dose})$ 715. The fourth code $Code_{dose}$ 714 and fourth forgery resistant tag (fourth cryptographic signature) $Sig_{PrvK}(Code_{dose})$ 715 may be appended to the dose 102 for subsequent authentication. All doses 102 (e.g., pills) in the particular container 104 may have the same $Code_{dose}$ 714 if all doses are nominally the same. For example, during manufacture, the dose 102 may be marked with the fourth code $Code_{dose}$ 714 which may be a function of, or equal to, its date of manufacture, composition, lot number, and/or other information associated with the product and/or manufacturer. The fourth code $Code_{dose}$ 714 may be appended to the dose 102, e.g., as a bar code or other form of alpha, numeric, and/or symbolic representation.

In a second implementation, the first code generator A 114 may simply generate a sequential series of codes or identifiers as the fourth code ($Code_{dose}$ 714) for each dose 102 in the container 104.

Due to the limited size of individual pharmaceutical doses (e.g., pills, capsules, or tablets), a bit-efficient cryptographic technique may be used to generate $Code_{dose}$ 714. That is, due to the small size of the dose 102, the $Code_{dose}$ 714 may be small.

Because there is a dependency among the codes (e.g., $Code_{dose}$ 714, $Code_{container}$ 710, $Code_{box}$ 708, and $Code_{pallet}$ 702) used for the largest package size (pallet 108) to the smallest dose 102, the end-to-end relationship of a pharmaceutical product (e.g., from pallet to dose) can be verified along its distribution channel using the appended codes, e.g., at the shipper/distributor 110 or at the retailer 112. Additionally, the authenticity of the appended codes may be verified using the forgery resistant tags appended with the codes. For example, a distributor or customs agent may check a pallet 108 to ascertain the authenticity of the pharmaceutical products therein. The authenticity of a dose 102 may be verified by determining whether $Code_{dose}$ 714 is based on (or identifies) $Code_{container}$ 710 and/or parameters A 716 and authenticating $Code_{dose}$ 714 using the fourth forgery resistant tag (e.g., fourth cryptographic signature) $Sig_{PrvK}(Code_{dose})$ 715. Similarly, the authenticity of the container 104 may be verified by determining whether $Code_{container}$ 710 is based on (or identifies) $Code_{box}$ 708 and/or Parameters B 712 and authenticating $Code_{container}$ 710 using the third forgery resistant tag (third cryptographic signature) $Sig_{PrvK}(Code_{container})$ 711. The authenticity of the box 106 may be verified by determining whether $Code_{box}$ 708 is based on (or identifies) $Code_{pallet}$ 702 and Parameters C 706 and authenticating $Code_{box}$ 708 using the second forgery resistant tag (e.g., second cryptographic signature) $Sig_{PrvK}(Code_{box})$ 709. Lastly, the fourth code $Code_{dose}$ 714 may be authenticated using the fourth forgery resistant tag $Sig_{PrvK}(Code_{dose})$ 715. If at any stage the dependency between an inner code and an outer code cannot be verified or the code authenticated, then authentication fails.

Figure 8:
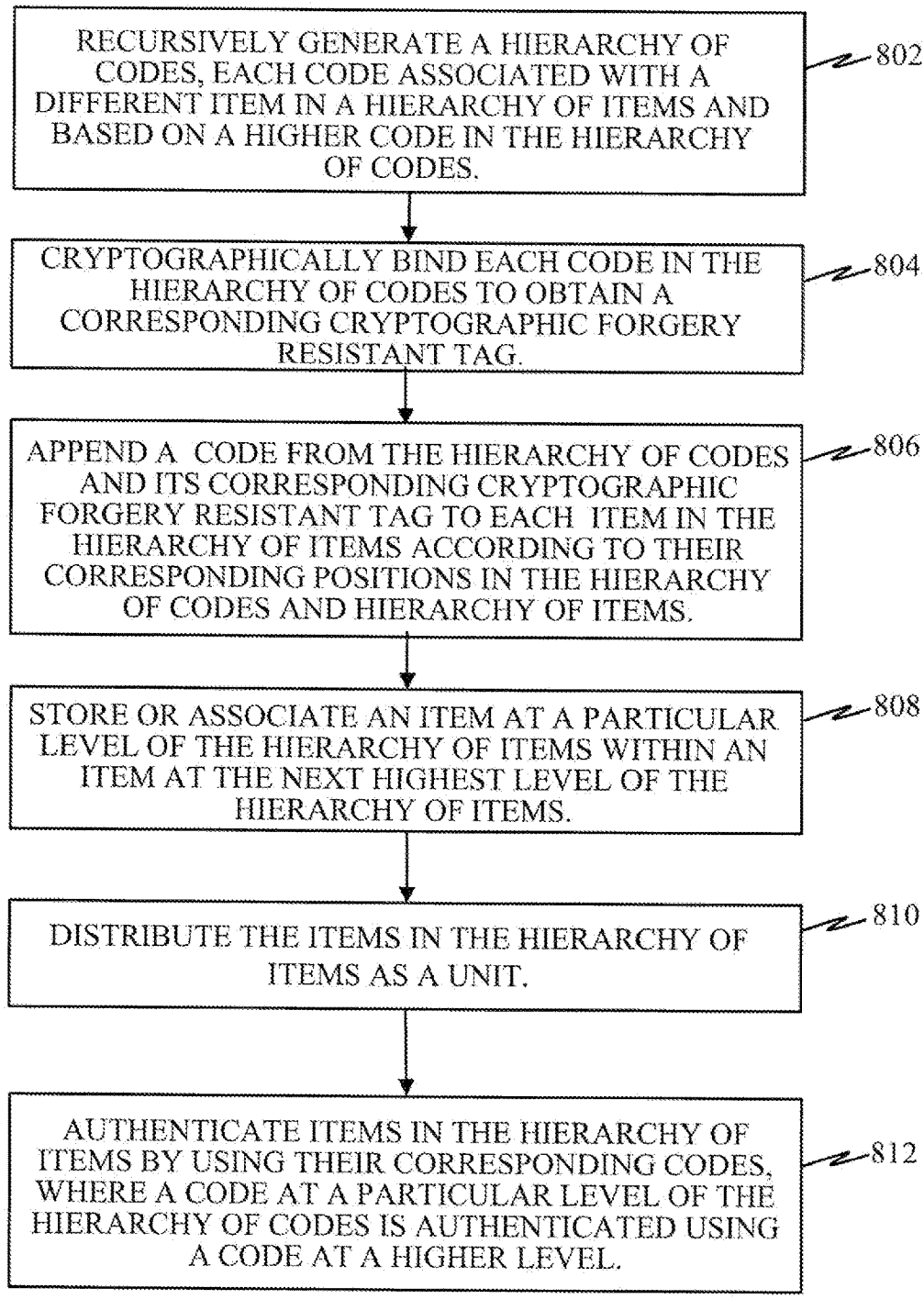
FIG. 8 illustrates an outside-to-inside cryptographic coding method for end-to-end product or item authentication.

FIG. 8 illustrates an outside-to-inside cryptographic coding method for end-to-end product or item authentication. A hierarchy of codes may be recursively generated, where each code is associated with a different item in a hierarchy of items and is based on a higher code in the hierarchy of codes 802. For example, the hierarchy of codes may include codes $Code_{dose}$ 714, $Code_{container}$ 710, $Code_{box}$ 708, and $Code_{pallet}$ 702 (in that order), where $Code_{dose}$ 714 is at the lowest level of the hierarchy and $Code_{pallet}$ 702 is at the highest level of the hierarchy. Similarly, the corresponding hierarchy of items may include items dose 102, container 104, box 106, and pallet 108 (in that order), where dose 102 is at the lowest level of the hierarchy and pallet 108 is at the highest level of the hierarchy. Consequently, $Code_{dose}$ 714 is a function of $Code_{container}$ 710, $Code_{container}$ 710 is a function of $Code_{box}$ 708, and $Code_{box}$ 708 is a function of $Code_{pallet}$ 702. Each code in the hierarchy of codes is cryptographically bound (e.g., signed) to other codes and/or parameters in order to obtain a corresponding forgery resistant tag (e.g., cryptographic signature) 804.

A code from the hierarchy of codes and its corresponding forgery resistant tag are appended to each item in the hierarchy of items according to their corresponding positions in the hierarchy of codes and the hierarchy of items 806. For example, $Code_{dose}$ 714 and tag $Sig(Code_{dose})$ 715 are appended to dose 102, $Code_{container}$ 710 and tag Sig $(Code_{container})$ 711 are appended to container 104, $Code_{box}$ 708 and tag $Sig(Code_{box})$ 709 are appended to box 106, and $Code_{pallet}$ 702 and tag $Sig(Code_{pallet})$ 703 are appended to pallet 108. A "corresponding position" in the hierarchy of codes and hierarchy of items means that a code at a level K of the hierarchy of codes corresponds to (or belongs to) an item at the same level K of the hierarchy of items.

An item at a particular level of the hierarchy of items is stored within, or associated with, an item at the next highest level of the hierarchy of items 808. For example, one or more doses 102 are stored within a container 104, one or more containers 104 are stored within a box 106, and one or more boxes are stored within a pallet 108.

The items in the hierarchy of items are then distributed as a unit 810. For instance, the pallet 108 (containing the doses 102, containers 104 and/or boxes 106) may be sent over a distribution channel.

Subsequently, at a retailer, destination or checkpoint, items in the hierarchy of items may be authenticated using their corresponding codes, where a code at a particular level of the hierarchy of codes is authenticated using a code at a higher level of the hierarchy of codes 812. For instance, the box 106 may be authenticated by verifying or authenticating $Code_{box}$ 708 based on $Code_{pallet}$ 702, authenticating $Code_{container}$ 710 based on $Code_{box}$ 708, and authenticating $Code_{dose}$ 714 based on $Code_{container}$ 710. Each code may also be authenticated or verified by using its corresponding forgery resistant tag (e.g., included with the code).

Figure 9A:
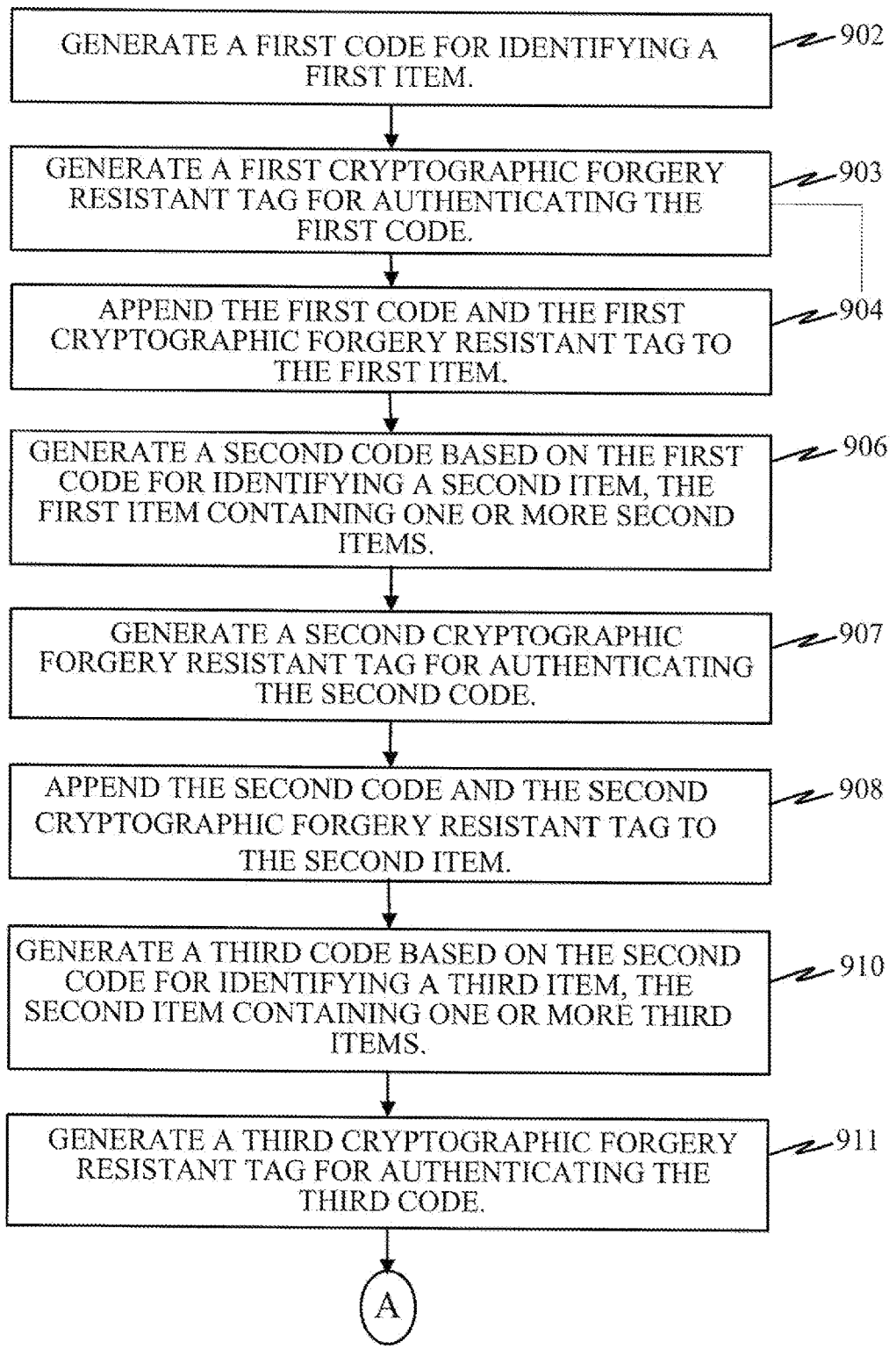
FIGS. 9A and 9B, illustrates a method for outside-to-inside code generation that facilitates end-to-end authentication.
Figure 9B:
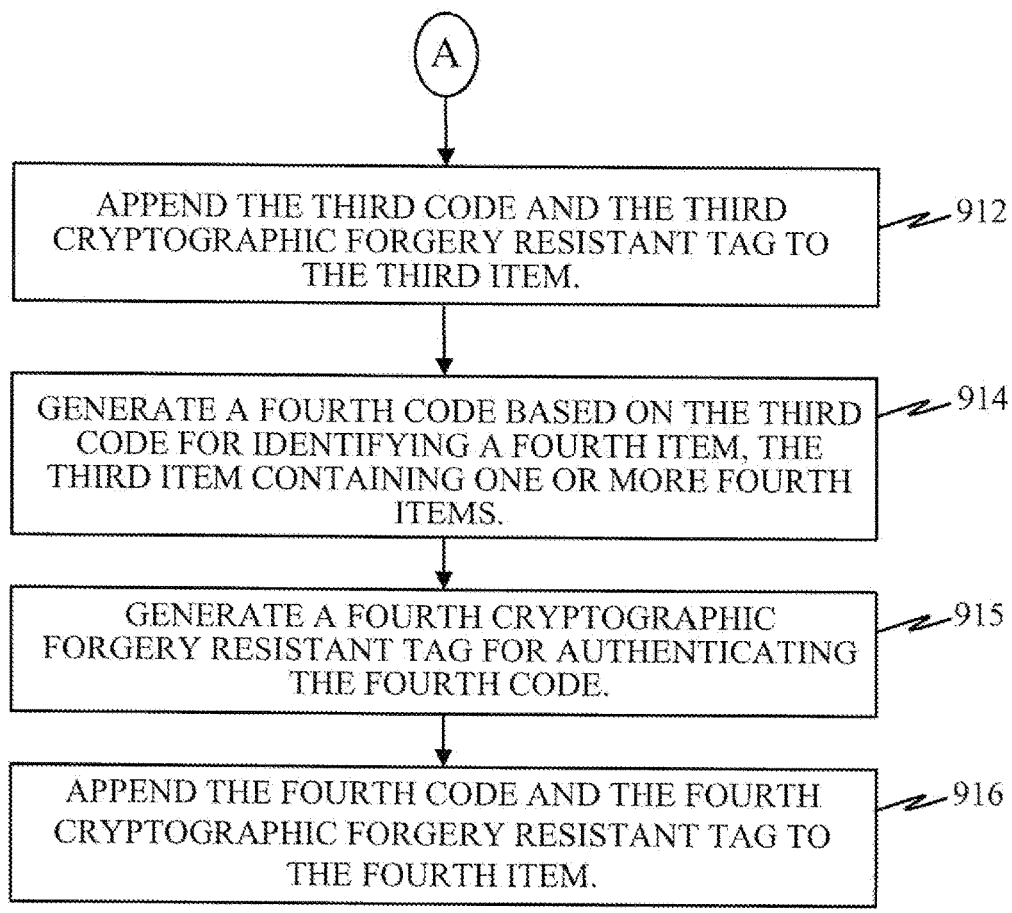

FIG. 9, comprising FIGS. 9A and 9B, illustrates a method for outside-to-inside code generation that facilitates end-to-end authentication. A first code (e.g., $Code_{pallet}$ 702) is generated for identifying a first item 902 (e.g., pallet). A first forgery resistant tag (e.g., first cryptographic signature $Sig_{PrvK}(Code_{pallet})$ 703) may then be generated for authenticating the first code 903. For instance, the first forgery resistant tag may be generated using a private key and a cryptographic function, and is verifiable or authenticatable using a corresponding public key. The first code and first forgery resistant tag are then appended to the first item 904.

A second code (e.g., $Code_{box}$ 708) is generated based on the first code for identifying a second item (e.g., box), the first item containing one or more second items 906. For instance, the second code may indicate an association with the first code or a relationship between the second item and the first item. A second forgery resistant tag (e.g., second cryptographic signature $Sig_{PrvK}(Code_{box})$ 709) may be generated for authenticating the second code 907. For instance, the second forgery resistant tag may be generated using the same private key and the cryptographic function, and is verifiable using the corresponding public key. The second code and second forgery resistant tag are then appended to the second item 908.

A third code (e.g., $Code_{container}$ 710) is generated based on the second code for identifying a third item (e.g., container), the second item containing one or more third items 910. For instance, the third code may indicate an association with the second code or a relationship between the third item and the second item. A third forgery resistant tag (e.g., third cryptographic signature $Sig_{PrvK}(Code_{container})$ 711) may then be generated for authenticating the third code 911. For instance, the third forgery resistant tag may be generated using the same private key and the cryptographic function, and is verifiable using the corresponding public key. The third code and third forgery resistant tag are then appended to the third item 912.

A fourth code (e.g., $Code_{dose}$ 714) is generated based on the third code for identifying a fourth item (e.g., dose), the third item containing one or more fourth items 914. For instance, the fourth code may indicate an association with the third code or a relationship between the fourth item and the third item. A fourth forgery resistant tag (e.g., cryptographic signature $Sig_{PrvK}(Code_{dose})$ 715) may then be generated for authenticating the fourth code 915. For instance, the fourth forgery resistant tag may be generated using the same private key and the cryptographic function, and is verifiable using the corresponding public key. The fourth code and fourth cryptographic forgery resistant tag are then appended to the fourth item 916.

Figure 10A:
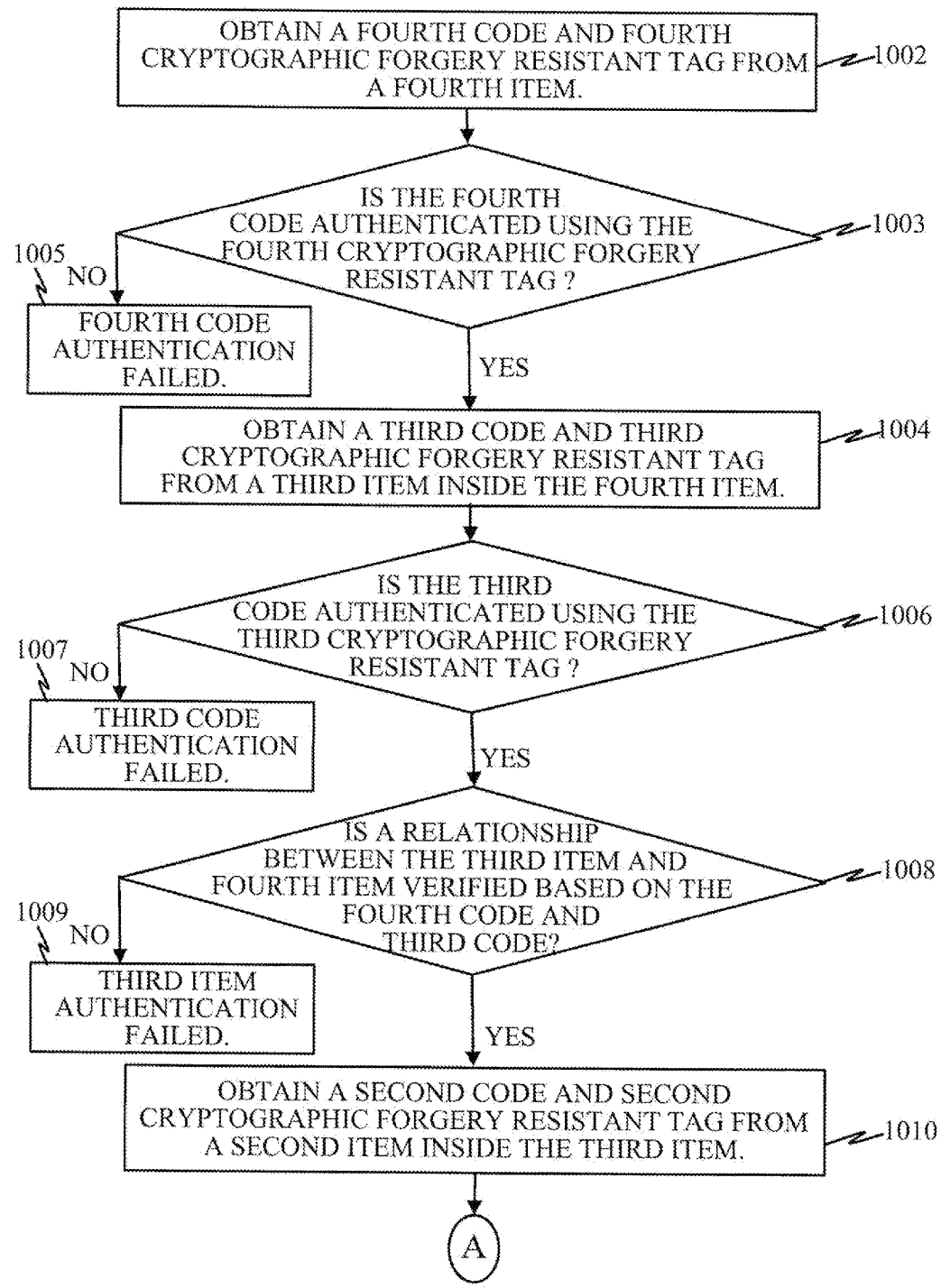
FIGS. 10A and 10B, illustrates a method of authenticating items that have been coded using an outside-to-inside cryptographic coding scheme.
Figure 10B:
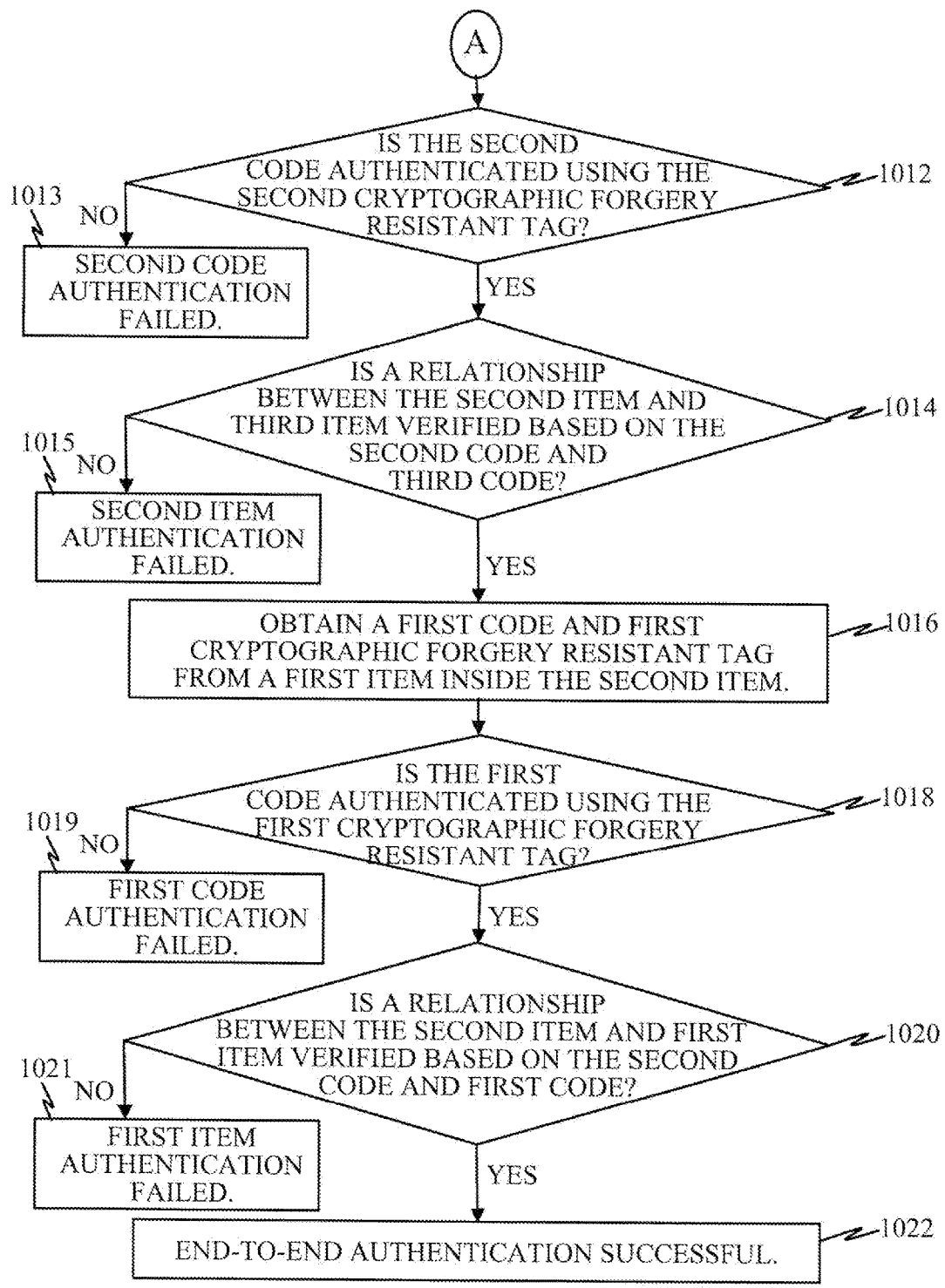

FIG. 10, comprising FIGS. 10A and 10B, illustrates a method of authenticating items that have been coded using an outside-to-inside cryptographic coding scheme. A fourth code (e.g., $Code_{pallet}$ 702) and a fourth forgery resistant tag (e.g., cryptographic signature $Sig_{PrvK}(Code_{pallet})$ 703) are obtained from a fourth item 1002. The fourth code may be authenticated using the fourth forgery resistant tag 1003. For instance, a public key is used to verify or authenticate the fourth forgery resistant tag and determine if its content matches the fourth code. Such public key may be obtained from the fourth item itself or may be provided from a manufacturer/packager of the fourth item. If there is no match, then authentication of the fourth code failed 1005. Otherwise, the fourth code is successfully authenticated.

A third code (e.g., $Code_{box}$ 708) and a third forgery resistant tag (e.g., cryptographic signature $Sig_{PrvK}(Code_{box})$ 709) are obtained from a third item inside the fourth item 1004. The third code may be authenticated using the third forgery resistant tag 1006. For instance, a public key is used to verify the third forgery resistant tag and determine if its content matches the third code. If there is no match, then authentication of the third code failed 1007. Otherwise, the third code is successfully authenticated.

A relationship between the third item and fourth item is then verified based on the fourth code and third code 1008. That is, because the third code is based on (or includes/identifies) the fourth code (and possibly other known parameters), an association between the third code and fourth code can be ascertained. If no association between the third code and fourth code can be ascertained (e.g., if the third code does not identify the fourth code), then authentication of the third item fails 1009. Otherwise, the third item is successfully authenticated.

Next, a second code and a second forgery resistant tag (cryptographic signature) are obtained from a second item inside the third item 1010. The second code may be authenticated using the second forgery resistant tag 1012. For instance, the public key is used to verify the second forgery resistant tag and determine if its content matches the second code. If there is no match, then authentication of the second code failed 1013. Otherwise, the second code is successfully authenticated.

A relationship between the second item and third item is then verified based on the second code and third code 1014. That is, because the second code is based on (or includes/identifies) the third code (and possibly other known parameters), an association between the second code and third code can be ascertained. If no association between the second code and third code can be ascertained (e.g., if the second code does not identify the third code), then authentication of the second item fails 1015. Otherwise, the second item is successfully authenticated.

Similarly, a first code and a first forgery resistant tag (cryptographic signature) are obtained from a first item inside the second item 1016. The first code may be authenticated using the first forgery resistant tag 1018. For instance, the public key is used to verify the first forgery resistant tag and determine if its content matches the first code. If there is no match, then authentication of the first code failed 619. Otherwise, the first code is successfully authenticated.

A relationship between the first item and second item is then verified based on the first code and second code 1020. That is, because the first code is based on (or includes/identifies) the second code (and possibly other known parameters), an association between the first code and second code can be ascertained. If no association between the first code and second code can be ascertained (e.g., if the first code does not identify the second code), then authentication of the first item fails 1021. Otherwise, the first item is successfully authenticated and end-to-end authentication is established 1022.

According to another feature, the distribution of products may be tracked to prevent reuse of authentic product codes. For example, once a pallet 108 reaches a destination (e.g., retailer, distributor, checkpoint, etc.), its code(s) are read and logged into a database. Any subsequent products arriving with the identical codes would, at minimum, indicate that a forgery has occurred. In some cases, the original or authentic product would have been shipped and logged into the database first. Thus, the subsequent products having identical codes may be considered forged. However, in some cases, a forged product may have been logged first (before the corresponding authentic product) and is not detected as a forgery. Even in this situation, subsequent forgeries would be detected, thereby inhibiting the economies of scale that make it profitable for forgers replicate an authentic product. That is, if a forger manages to obtain an authentic product (prior to the authentic product being logged into the database), at most just a single forged product would manage to be distributed. Therefore, this would typically make it unprofitable to replicate an authentic product.

Exemplary Apparatus for Hierarchical Coding of Items

Figure 11:
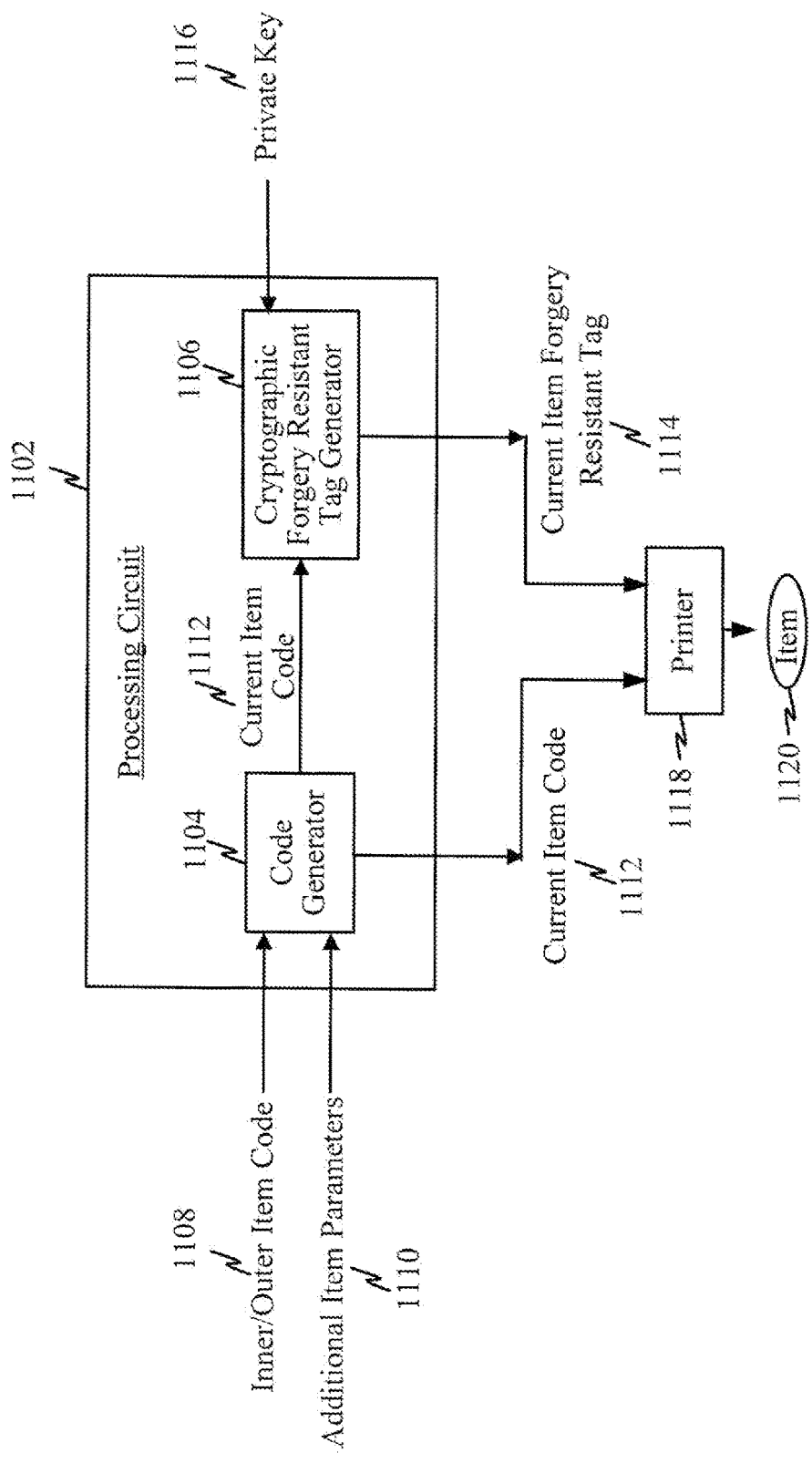
FIG. 11 is a block diagram illustrating an apparatus adapted to recursively generate codes and/or cryptographic forgery resistant tags (e.g., signatures) for a hierarchy of items to inhibit introduction of forged items in a distribution channel.

FIG. 11 is a block diagram illustrating an apparatus adapted to recursively generate codes and/or cryptographic forgery resistant tags (e.g., signatures) for a hierarchy of items to inhibit introduction of forged items in a distribution channel. The apparatus may include a processing circuit and modules adapted to generate a code and its cryptographic forgery resistant tag according to an end-to-end cryptographic scheme. For instance, a processing circuit may include a code generator 1104 and a cryptographic forgery resistant tag generator 1106. The code generator 1104 is adapted to receive either an inner or outer item code 1108 and, optionally, one or more item parameters 1110. An inner item code may be used with an inside-to-outside scheme and an outer item code may be used with an outside-to-inside scheme. The one or more parameters 1110 may identify the current item, its manufacturing stage or date, the manufacturer or package, an item size and/or other current item characteristics. The code generator 1104 then generates a current item code 1112 based on the inner/outer item code 1108 and/or additional item parameters 1110. For example, the code generator 1104 may merely combine the inner/outer item code 1108 and/or additional item parameters 1110 into a new current item code 1112. Alternatively, the code generator 1104 may generate the current item code 112 so as to indicate a relationship with, or identify, the inner/outer item code 1108. The cryptographic forgery resistant tag generator 1106 may receive the current item code 1112 and a private key 1116 associated with the current item or its manufacturer, distributor, and/or packager. The cryptographic forgery resistant tag generator 1106 generates a current item forgery resistant tag 1114 of the current item code 1112 using the private key 1116 and a cryptographic function. The current item code 1112 and current item forgery resistant tag 1114 may be appended to, or otherwise associated with, the current item for distribution.

The apparatus may further include, or is coupled to, a printer 1118 that is adapted to append the current item code 1112 and/or the current item forgery resistant tag 1114 to an item 1120. The printer 1118 may generate a label that is appended to the item 1120 or it may apply the code 1112 and forgery resistant tag 1114 directly onto the pill (e.g., using ink, etching, or inscribing).

Figure 12:
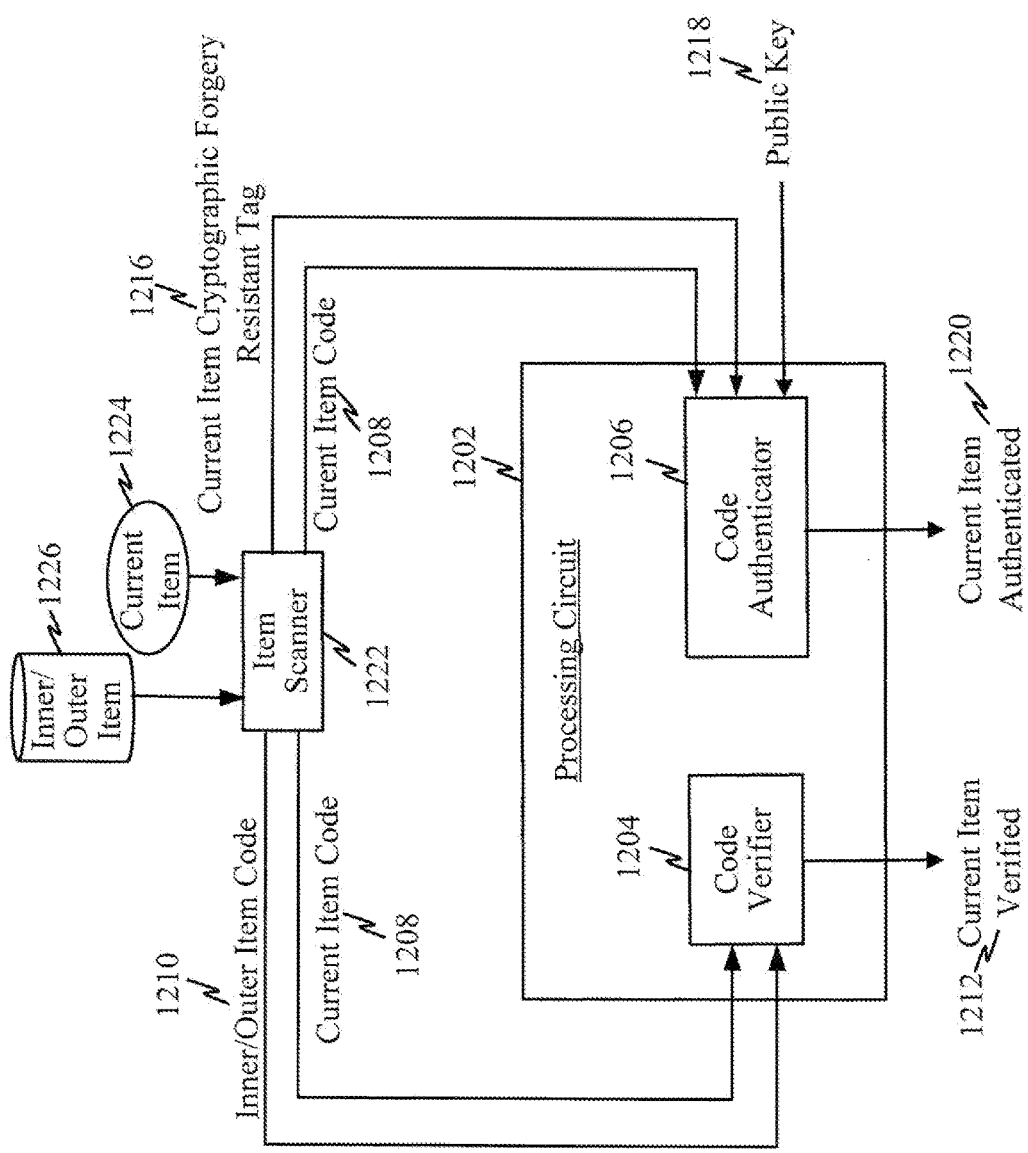
FIG. 12 is a block diagram illustrating an apparatus adapted to verify at least one item in a hierarchy of codes and/or cryptographic forgery resistant tags (e.g., signatures) to authenticate a relationship among a plurality of items.

Exemplary Apparatus for Verification/Authentication of Hierarchically Coded Items FIG. 12 is a block diagram illustrating an apparatus adapted to verify at least one item in a hierarchy of codes and/or cryptographic forgery resistant tags (e.g., signatures) to authenticate a relationship among a plurality of items. The apparatus may include a processing circuit and modules adapted to authenticate an item code and its cryptographic forgery resistant tag according to an end-to-end authentication scheme. For instance, a processing circuit may include a code verifier 1204 and a code authenticator 1206. The apparatus may include an item scanner 1222 (or some other input device) to obtain one or more item codes and/or cryptographic forgery resistant tags from one or more items (e.g., a current item 1224 and an inner/outer item 1226).

The code verifier 1204 is adapted to receive or obtain (e.g., via the item scanner 1222) a current item code 1208 and either an inner or outer item code 1210 (e.g., from an inner or outer item 1226, such as a box or container of the current item 1224). An inner item code may be used with an inside-to-outside scheme and an outer item code may be used with an outside-to-inside scheme. The code verifier 1204 determines whether the current item code 1208 identifies or indicates a relationship, association, and/or dependency with the inner or outer item code 1210. For example, the code verifier 1204 may merely determine whether portions of the current item code 1208 include the inner/outer item code 1210. If a relationship, identification, or association between the current item code and the inner/outer item code 1212 is verified, then the current item has been successfully verified.

Either before or after the current item is verified, the code authenticator 1206 may ascertain the authenticity of the obtained current item code 1208. The code authenticator 1206 obtains the current item code 1208, a current item cryptographic forgery resistant tag 1216 and a corresponding public key 1218. The public key may be a key that is associated with the manufacturer or the current item. The code authenticator 1206 authenticates the current item by using the public key to access a content in the current item cryptographic forgery resistant tag 1216 and then comparing at least part of the content of the forgery resistant tag to the current item code 1208. If the current item code 1208 matches the content or at least part of the content, then the current item code 1208 has been successfully authenticated 1220.

Item Verification and Authentication Based on Hierarchical Coding of Items

Figure 13:
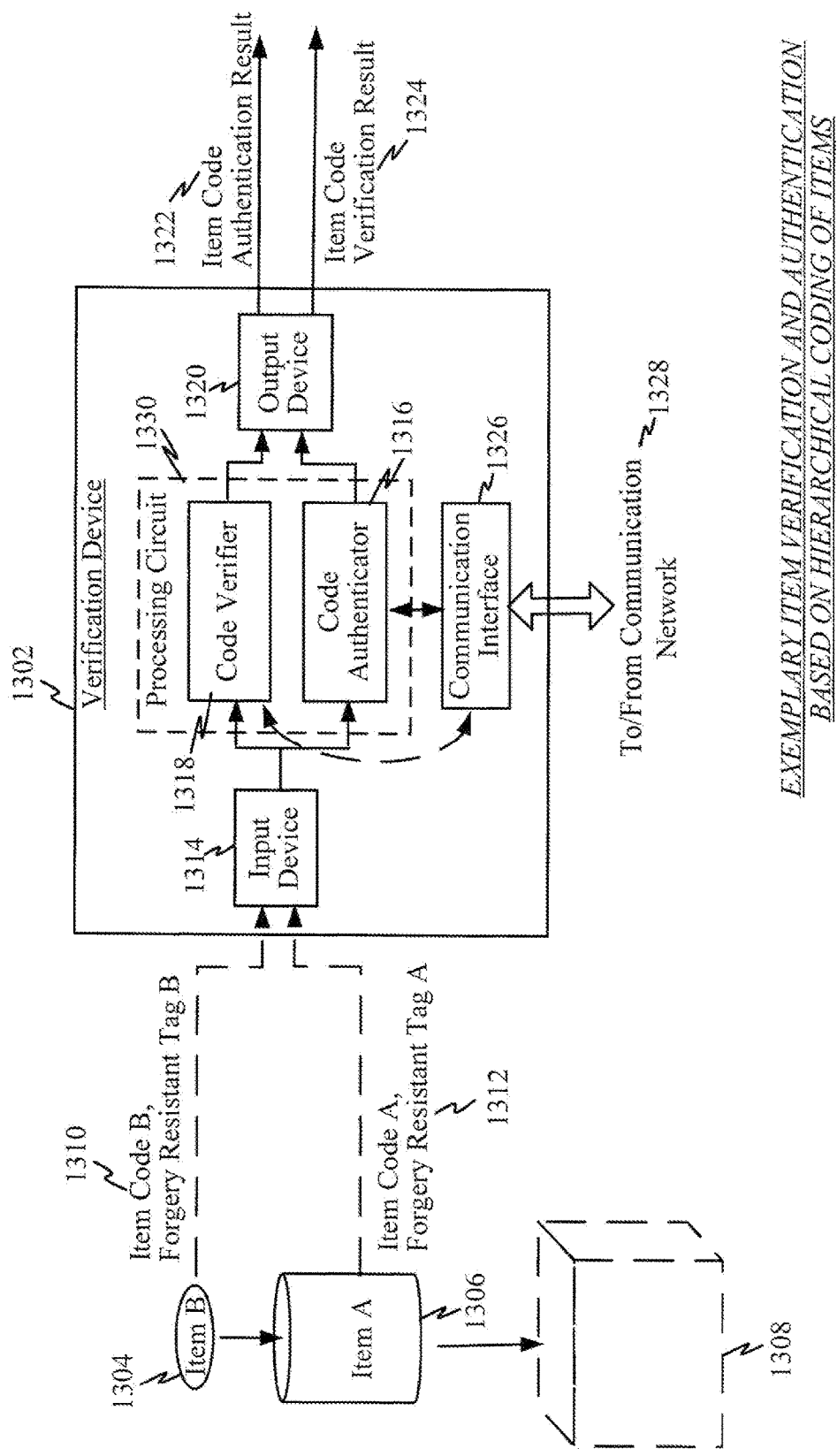
FIG. 13 is a block diagram illustrating the verification and/or authentication of items based on a hierarchical coding of items.

FIG. 13 is a block diagram illustrating the verification and/or authentication of items based on a hierarchical coding of items. Here, a verification device 1302 (e.g., a mobile communication device, an access terminal, an mobile phone, etc.) 1302 may be used to verify and/or authenticate an item relative to either its container (e.g., inside-to-outside cryptographic coding illustrated in FIG. 2) or the contents in the item (e.g., outside-to-inside cryptographic coding illustrated in FIG. 7). For purposes of this example, lets assume that Item A 1306 contains Item B 1304. A user may seek to verify Item A 1306 and/or Item B 1304 to make sure it is authentic and not a forgery. Here, the verification device 1302 may include an input device 1314 (e.g., scanner, keypad, camera, etc.), a code authenticator 1316, a code verifier 1318, and an output device 1320 (e.g., audio or display screen). The input device 1314 may obtain or capture an Item Code A and/or a corresponding Forgery Resistant Tag A 1312 from Item A 1306. Similarly, the input device 1314 may obtain or capture an Item Code B and/or a corresponding Forgery Resistant Tag B 1310 from Item B 1304.

To determine whether an item code is authentic (e.g., not forged), the input device 1314 may send the item code and its corresponding forgery resistant tag to the code authenticator 1316. The code authenticator 1316 may then validate the item code by using the forgery resistant tag. For instance, the code authenticator 1316 may obtain a public key (e.g., either beforehand or dynamically via a communication interface 1316 to/from a communication network 1328) associated with a manufacturer, packager, or distributor of an item. Such public key may be obtained from a third party network device or from a manufacturer or distributor. The public key is then used to access content in the forgery resistant tag. If the content in the forgery resistant tag matches the corresponding item code, then the item code is successfully authenticated. Otherwise, item code authentication fails. This process may be performed for Item Code A and/or Item Code B. The results of such authentication 1322 may be provided to the user via the output device 1320.

To determine whether Item B 1306 truly belongs in Item A, the code verifier 1326 attempts to determine whether there is a relationship between Item Code A and Item Code B. The code verifier 1318 may make this determination by using an algorithm to determine whether Item Code B is based on Item Code A (or vise versa). Alternatively, the code verifier 1318 may send all or part of Item Codes A and B via the communication interface 1326 to be verified by another entity. In an inside-to-outside hierarchical coding scheme, if Item Code A is successfully verified (e.g., Item Code A was successfully recreated based on Item Code B and/or one or more other parameters), then an item code verification result 1324 is provided. In an outside-to-inside hierarchical coding scheme, if Item Code B is successfully verified (e.g., Item Code B was successfully recreated based on Item Code A and/or one or more other parameters), then the item code verification result 1324 is provided. The results of such verification 1324 may be provided to the user via the output device 1320.

Note that this process may be repeated for multiple other items 1308 to ascertain the authenticity of each item along a hierarchy of items. This may allow a seller, distributor, and/or end consumer to verify the authenticity of an item prior to purchase or consumption.

Note that the code verifier 1318 and code authenticator 1316 may be implemented as software operating in a processing circuit 1330 within the verification device 1302.

Figure 14:
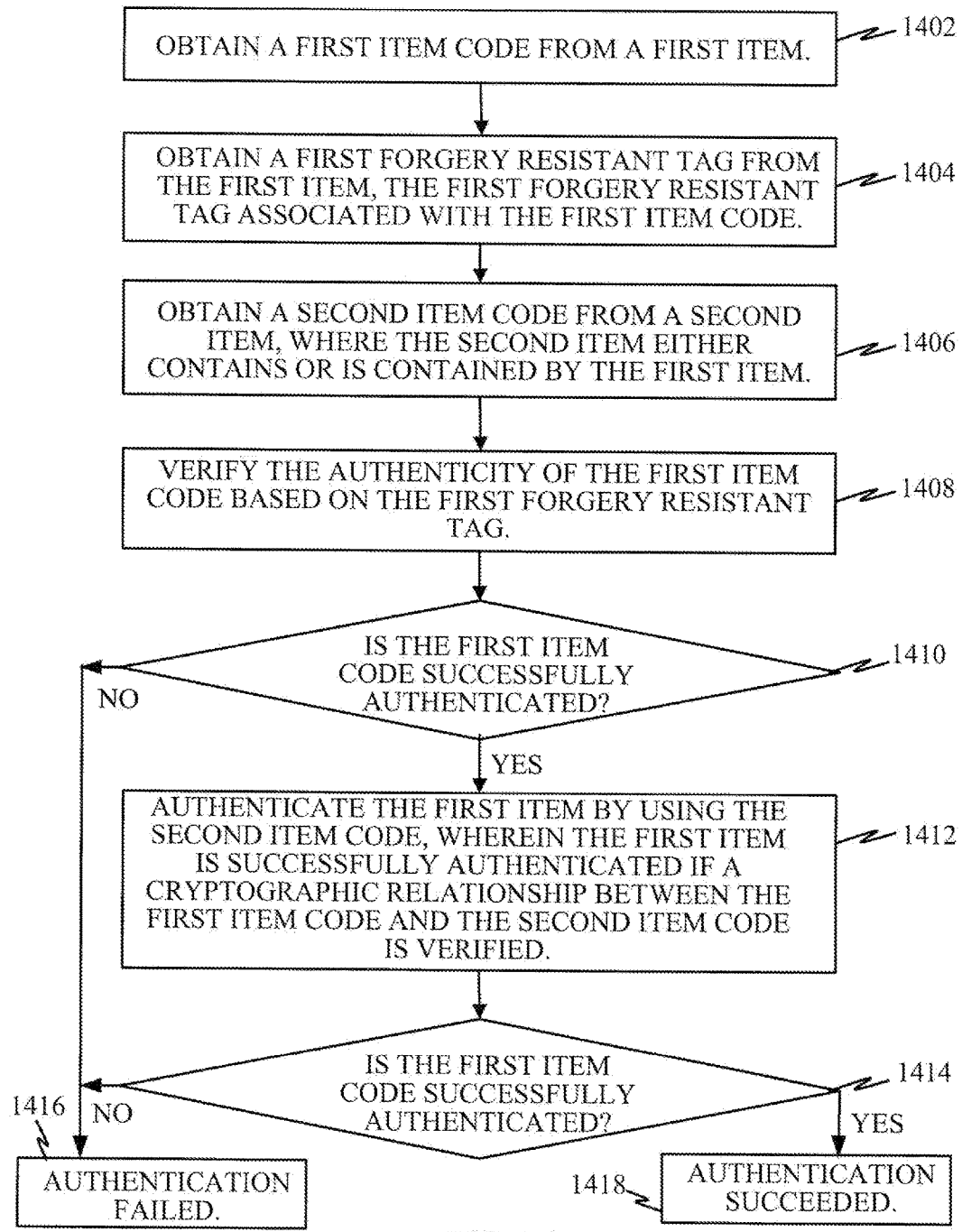
FIG. 14 illustrates a method for authenticating a first item based on a hierarchy of codes.

FIG. 14 illustrates a method for authenticating a first item based on a hierarchy of codes. A first item code is obtained from the first item 1402. A first forgery resistant tag is also obtained from the first item, the first forgery resistant tag associated with the first item code 1404. A second item code may be obtained from a second item, where the second item either contains or is contained by the first item 1406. The authenticity of the first item code may first be verified based on the first forgery resistant tag 1408. If the first item code is not successfully authenticated 1410, then authentication fails 1416. Otherwise, the first item may be further authenticated by using the second item code, wherein the first item is successfully authenticated if a cryptographic relationship between the first item code and the second item code is verified 1412. If the first item code is successfully authenticated 1414, then authentication succeeded 1418. According to one feature, an indicator may be provided of whether the first item is successfully authenticated or not. In one example, the cryptographic relationship between the first item code and the second item code is verified if the first item code is based at least in part on the second item code.

Note that the first and second item codes may be part of the hierarchy of codes, where a code at a particular level of the hierarchy of codes is authenticated using another code at either the next lowest level or the next highest level of the hierarchy of codes. The first item may be secured against forgery during distribution by virtue of the relationship between the first and second item codes and corresponding cryptographic forgery resistant tags for each item.

The authentication scheme may be further expanded to additional items. For example, a third item code may be obtained from a third item, where the third item either contains or is contained by the second item. The second item may be authenticated by using the third item code, wherein the second item is successfully authenticated if a cryptographic relationship between the second item code and the third item code is verified.

The apparatus illustrated in FIGS. 11, 12, and 13 may be adapted to implement any of the methods and/or features illustrated in FIGS. 1-10 and 14.

The various illustrative logical blocks, modules and circuits and algorithm steps described herein may be implemented or performed as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

When implemented in hardware, various examples may employ a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

When implemented in software, various examples may employ firmware, middleware or microcode. The program code or code segments to perform the necessary tasks may be stored in a machine-readable or computer-readable medium such as a storage medium or other storage(s). One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more examples herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Software may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

One or more of the components, steps, and/or functions illustrated in the Figures may be rearranged and/or combined into a single component, step, or function or embodied in several components, steps, or functions without the features described herein. Additional elements, components, steps, and/or functions may also be added without departing from the invention. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for authenticating a first item based on a hierarchy of codes, comprising:
    obtaining a first item code from the first item using an input device;
    obtaining a second item code from a second item using the input device, where the second item is contained by the first item, wherein the first and second items are part of a hierarchy of items with each item code associated with a different item in the hierarchy of items and with the first item code cryptographically bound to the second item code; and
    authenticating the first item using a processing circuit by using the second item code, wherein the first and second item codes are part of the hierarchy of codes and the first item code is recursively derived from the second item code, and wherein the first item is successfully authenticated if a cryptographic relationship between the first item code and the second item code is verified.

2. The method of claim 1, further comprising:
    providing an indicator of whether the first item is successfully authenticated.

3. The method of claim 1, further comprising:
    obtaining a first forgery resistant tag from the first item, the first forgery resistant tag associated with the first item code; and
    verifying the authenticity of the first item code based on the first forgery resistant tag.

4. The method of claim 1, wherein the first item is secured against forgery during distribution by virtue of the relationship between the first and second item codes and corresponding cryptographic forgery resistant tags for each item.

5. The method of claim 1, comprising:
    obtaining a third item code from a third item, where the third item is contained by the second item; and
    authenticating the second item by using the third item code, wherein the second item is successfully authenticated if a cryptographic relationship between the second item code and the third item code is verified.

6. The method of claim 1, further comprising recursively generating the hierarchy of codes, wherein at least one code in the hierarchy of codes is recursively generated by deriving the code from a lower code from another level in the hierarchy of codes.

7. The method of claim 6, further comprising non-recursively generating an initial set of codes for inclusion in the hierarchy of codes and wherein the recursively generated codes of the hierarchy of codes are recursively derived, at least in part, from the initial set of codes.

8. The method of claim 1, wherein the hierarchy of codes includes a first hierarchy of codes associated with a first party and a second hierarchy of codes associated with a second party, wherein at least one code in the second hierarchy of codes is based on at least one code in the first hierarchy of codes.

9. The method of claim 1, wherein a different item code from the hierarchy of codes and a corresponding cryptographic forgery resistant tag are physically appended to each item in the hierarchy of items according to corresponding levels in the hierarchy of codes and the hierarchy of items.

10. The method of claim 1, wherein the first item code is signed using a private key (PrvK) and cryptographic hash function to generate a first forgery resistant tag for subsequent authentication by verifying the first forgery resistant tag using a corresponding public key.

11. The method of claim 1, wherein there are a plurality of second items of a particular type and wherein the second item code is the same for all second items of the particular type.

12. The method of claim 11, wherein the particular type of the plurality of second items is a dose.

13. The method of claim 1, wherein the second item code is a date of manufacture of the second item.

14. The method of claim 1, wherein the second item code is a packaging date.

15. An apparatus adapted to authenticate a first item based on a hierarchy of codes, comprising:
an input device having circuitry for
obtaining a first item code from the first item, and
obtaining a second item code from a second item, where the second item is contained by the first item, wherein the first and second items are part of a hierarchy of items with each item code associated with a different item in the hierarchy of items and with the first item code cryptographically bound to the second item code; and
a processing circuit coupled to the input device, the processing circuit for authenticating the first item by using the second item code, wherein the first and second item codes are part of the hierarchy of codes and the first item code is recursively derived from the second item code, and wherein the first item is successfully authenticated if a cryptographic relationship between the first item code and the second item code is verified.

16. The apparatus of claim 15, further comprising:
an output device coupled to the processing circuit, the output device having circuitry for providing an indicator of whether the first item is successfully authenticated.

17. The apparatus of claim 15, wherein the input device further includes circuitry for obtaining a first forgery resistant tag from the first item, the first forgery resistant tag associated with the first item code; and
the processing circuit further includes circuitry for verifying the authenticity of the first item code based on the first forgery resistant tag.

18. The apparatus of claim 15, wherein the first item is secured against forgery during distribution by virtue of the relationship between the first and second item codes and corresponding cryptographic forgery resistant tags for each item.

19. The apparatus of claim 15, wherein the input device is a scanner.

20. The apparatus of claim 15, wherein a different item code from the hierarchy of codes and a corresponding cryptographic forgery resistant tag are physically appended to each item in the hierarchy of items according to corresponding levels in the hierarchy of codes and the hierarchy of items.

21. The apparatus of claim 15, wherein the first item code is signed using a private key (PrvK) and cryptographic hash function to generate a first forgery resistant tag for subsequent authentication by verifying the first forgery resistant tag using a corresponding public key.

22. The apparatus of claim 15, wherein there are a plurality of second items of a particular type and wherein the second item code is the same for all second items of the particular type.

23. The apparatus of claim 22, wherein the particular type of the plurality of second items is a dose.

24. An apparatus adapted to authenticate a first item based on a hierarchy of codes, comprising:
means for obtaining a first item code from the first item;
means for obtaining a second item code from a second item, where the second item is contained by the first item, wherein the first and second items are part of a hierarchy of items with each item code associated with a different item in the hierarchy of items and with the first item code cryptographically bound to the second item code; and
means for authenticating the first item by using the second item code, wherein the first and second item codes are part of the hierarchy of codes and the first item code is recursively derived from the second item code, and wherein the first item is successfully authenticated if a cryptographic relationship between the first item code and the second item code is verified.

25. A non-transitory machine-readable medium comprising instructions for authenticating a first item based on a hierarchy of codes, which when executed by a processor causes the processor to:
obtain a first item code from the first item;
obtain a second item code from a second item, where the second item is contained by the first item, wherein the first and second items are part of a hierarchy of items with each item code associated with a different item in the hierarchy of items and with the first item code cryptographically bound to the second item code; and
authenticate the first item by using the second item code, wherein the first and second item codes are part of the hierarchy of codes and the first item code is recursively derived from the second item code, and wherein the first item is successfully authenticated if a cryptographic relationship between the first item code and the second item code is verified.

* * * * *